United States Patent
Testa et al.

(10) Patent No.: US 10,873,409 B2
(45) Date of Patent: Dec. 22, 2020

(54) OPTICAL SWITCH

(71) Applicant: Telefonaktiebolaget LM Ericsson (publ), Stockholm (SE)

(72) Inventors: Francesco Testa, Pisa (IT); Alberto Bianchi, Pisa (IT); Filippo Ponzini, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/321,290

(22) PCT Filed: Aug. 3, 2016

(86) PCT No.: PCT/EP2016/068586
§ 371 (c)(1),
(2) Date: Jan. 28, 2019

(87) PCT Pub. No.: WO2018/024330
PCT Pub. Date: Feb. 8, 2018

(65) Prior Publication Data
US 2019/0173603 A1 Jun. 6, 2019

(51) Int. Cl.
*H04B 10/00* (2013.01)
*H04J 14/02* (2006.01)
*H04Q 11/00* (2006.01)

(52) U.S. Cl.
CPC ...... *H04J 14/0213* (2013.01); *H04J 14/0212* (2013.01); *H04Q 11/0005* (2013.01);
(Continued)

(58) Field of Classification Search
USPC .................................................. 398/45–57
See application file for complete search history.

(56) References Cited

U.S. PATENT DOCUMENTS

| 6,115,517 A * | 9/2000 | Shiragaki ............ H04J 14/0212 385/16 |
| 6,243,178 B1 * | 6/2001 | Suemura ............ H04Q 11/0005 398/56 |

(Continued)

FOREIGN PATENT DOCUMENTS

DE  10 2005 051 292 A1  12/2006
WO  2016 105257 A1  6/2016

OTHER PUBLICATIONS

A Survey on Optical Interconnects for Data Centers by Christoforos Kachris and Ioannis Tomkos; IEEE Communications Surveys & Tutorials, vol. 14. No. 4, Fourth Quarter—2012.
(Continued)

*Primary Examiner* — Agustin Bello
(74) *Attorney, Agent, or Firm* — Baker Botts, LLP

(57) ABSTRACT

A wavelength selective optical switching arrangement (23) comprises a set of input ports (61), a set of output ports (65); a switching matrix; and a plurality of de-multiplexers each comprising an aggregate port (62) and a plurality of tributary ports (64), each aggregate port being connected to an input port and each tributary port being connected to the switching matrix (57), the switching matrix being coupled between the tributary ports and the output ports. The wavelength selective optical switching arrangement is configured to receive at an input port a group of optical signals, each optical signal being transmitted on a different wavelength and being assigned to one of a plurality of destination nodes. The wavelength selective optical switching arrangement is further configured to de-multiplex the group of optical signals in a said demultiplexer; re-group the optical signals into destination groups according to their destination node; and route each destination group to a respective output port assigned to the destination group.

15 Claims, 22 Drawing Sheets

(52) U.S. Cl.
CPC ............ *H04Q 2011/005* (2013.01); *H04Q 2011/0016* (2013.01); *H04Q 2011/0058* (2013.01)

(56) References Cited

U.S. PATENT DOCUMENTS

| | | | | |
|---|---|---|---|---|
| 6,674,937 | B1* | 1/2004 | Blair | G02B 6/29383 372/20 |
| 6,708,000 | B1* | 3/2004 | Nishi | H04J 14/0227 398/1 |
| 6,792,208 | B1* | 9/2004 | Mukherjee | H04Q 11/0005 398/45 |
| 7,606,494 | B1* | 10/2009 | Weston-Dawkes | H04J 14/0212 398/48 |
| 7,986,881 | B2* | 7/2011 | Weston-Dawkes | H04J 14/0212 398/48 |
| 8,280,257 | B2* | 10/2012 | Yang | H04J 14/0206 398/25 |
| 8,611,743 | B2* | 12/2013 | Ji | H04J 14/0212 398/45 |
| 8,718,465 | B1* | 5/2014 | Sahebekhtiari | H04Q 11/00 370/216 |
| 8,787,762 | B2* | 7/2014 | Ji | H04J 14/0212 398/79 |
| 9,112,636 | B2* | 8/2015 | Testa | H04J 14/0212 |
| 9,551,836 | B2* | 1/2017 | Frankel | H04B 10/271 |
| 9,614,787 | B2* | 4/2017 | Rauh | H04L 49/101 |
| 9,634,791 | B2* | 4/2017 | Boertjes | H04J 14/0204 |
| 9,647,790 | B2* | 5/2017 | D'Errico | H04J 14/0212 |
| 9,860,614 | B2* | 1/2018 | Graves | H04Q 11/0003 |
| 9,860,615 | B2* | 1/2018 | Graves | H04Q 11/0003 |
| 10,212,497 | B2* | 2/2019 | Morris | H04L 47/00 |
| 2005/0226620 | A1* | 10/2005 | Feuer | H04J 14/0212 398/83 |
| 2006/0056848 | A1* | 3/2006 | Nishi | H04Q 11/0005 398/45 |
| 2006/0098983 | A1* | 5/2006 | Han | H01J 14/0204 398/83 |
| 2006/0216029 | A1* | 9/2006 | Vassilieva | H04J 14/0204 398/83 |
| 2007/0003283 | A1* | 1/2007 | Feuer | H04B 10/2503 398/83 |
| 2007/0280695 | A1* | 12/2007 | Li | H04B 10/506 398/135 |
| 2008/0124081 | A1* | 5/2008 | Hamada | H04J 14/0212 398/59 |
| 2012/0213517 | A1* | 8/2012 | Ji | H04J 14/0212 398/48 |
| 2012/0213523 | A1* | 8/2012 | Ji | H04J 14/0212 398/83 |
| 2012/0251042 | A1* | 10/2012 | Julien | H04Q 11/0005 385/17 |
| 2013/0209101 | A1* | 8/2013 | Hui | H04Q 11/0005 398/50 |
| 2013/0308951 | A1* | 11/2013 | Blumenthal | H04J 14/02 398/83 |
| 2014/0126904 | A1* | 5/2014 | Testa | H04J 14/0212 398/48 |
| 2014/0270762 | A1* | 9/2014 | Li | H04L 45/02 398/45 |
| 2015/0168803 | A1* | 6/2015 | Xu | G02F 1/353 359/332 |
| 2015/0180579 | A1* | 6/2015 | Tajima | H04B 10/40 398/135 |
| 2016/0044393 | A1* | 2/2016 | Graves | H04Q 11/0003 398/51 |
| 2019/0173603 | A1* | 6/2019 | Testa | H04J 14/0212 |

OTHER PUBLICATIONS

OSA: An Optical Switching Architecture for Data Center Networks With Unprecedented Flexibility by Kai Chen et al., Northwestern University, UIUC, NEC Labs America, Inc.—2012.

Cascaded Microresonator-Based Matrix Switch for Silicon On-Chip Optical Interconnection by Andrew W. Poon et al.; Proceedings of the IEEE, vol. 97, No. 7—Jul. 2009.

On the Feasibility of Optical Circuit Switching for High Performance Computing Systems by Kevin J. Barker et al.; Seattle, Washington—Nov. 12-18, 2005.

International Search Report for International application No. PCT/EP2016/068586—dated Apr. 19, 2017.

The Emerging Optical Data Center by Amin Vahdat et al.; OTuH2.pdf—2011.

* cited by examiner

OPTICAL SWITCH

PRIORITY

This nonprovisional application is a U.S. National Stage Filing under 35 U.S.C. § 371 of International Patent Application Serial No. PCT/EP2016/068586 filed Aug. 3, 2016 and entitled "Optical Switch" which is hereby incorporated by reference in its entirety.

TECHNICAL FIELD

The present invention relates to optical switches.

BACKGROUND

Optical circuit switching (OCS) is receiving increased interest for application in intra data center networking. In fact, it has been found from the statistics of data transfer inside a data center that a small number of data flows having a large size (elephant flows) carry the majority of Internet traffic volume and the rest consists of a large number of mice flows that carry very little Internet traffic. Elephant flows are long-lived flows that transfer large amounts of data and have low sensitivity to latency. They can fill up network buffers, with increased latency also for the mice flows. Mice data flows are for example emails, web pages, data requests or any other short-lived data flow. Elephant data flows are for example flows such as Virtual Machine, VM, migrations, data migrations and other types of flows that impact network bandwidth for minutes or hours. Elephant flows are now increasing in frequency and length due to growth in virtualization and big data.

It has been proposed in to use a combination of packet switching and optical circuit switching in a data center for smartly routing long-lived, high bandwidth, latency-insensitive elephant flows through optical switches and other bursty and low-latency traffic through electronic packet switches. Packet switches which are offloaded from elephant flows can provide improved latency performances. In addition, energy efficiency is strongly improved, leading to a reduction of operational and capital expenses.

FIG. 1 is a schematic diagram of a data center architecture 1 according to the prior art. The network links "compute nodes" 2 (servers) and storage nodes 3. Two subnetworks are provided, an electronic packet switched sub-network 4 comprising a plurality of electrical links 5 linking switches or routers 6, and an optical offload sub-network 7, comprising a plurality of optical links 8 linking optical cross-connects 9.

The architecture of FIG. 1 is based on two complementary networks, an electronic packet switch network and an optical circuit switch network interconnecting many compute nodes (servers) and storage nodes. This architecture requires many planes of high radix optical space switches due to the fact that a single optical signal is delivered at each switch input port. Commercial optical space switches are based on 3D MEMS technology and they are non-suitable for mass-production, have a large footprint and their cost per port is too high for data center application. Moreover, the switching time is too long, even in the order of tens of milliseconds.

An architecture based on two levels of optical switching has been proposed in Chen, A. Single, A. Singh, K. Ramachandran, L. Xu, Y. Zhang, X. Wen and Y. Chen: "OSA: An Optical Switching Architecture for Data Center Networks With Unprecedented Flexibility", IEEE/ACM Transactions on Networking, Vol. 22, N. 2, April 2014. The two levels of switching are wavelength and space switching. Wavelength multiplexing and switching are used to prepare the signals before the space switching operation. FIG. 2 is a schematic diagram of this architecture. Servers 9 are connected to top of rack switches 10, which aggregate traffic to be sent to the optical network 11. The top of rack switches 10 comprise optical transmitters of different wavelengths. These wavelengths are multiplexed together by multiplexer 12 and are then fed to a wavelength selective switch 13. In the receive direction, a coupler 14 combines the wavelengths from multiple ports and a de-multiplexer 15. The wavelength selective switch splits up the wavelengths and directs them to appropriate ports in an optical switching matrix 16. A plurality of optical circulators 17 is provided to separate transmit and receive wavelengths.

The arrangement of FIG. 2 enables all the wavelengths sent to a common port in the space switch (optical switching matrix) to be switched all together. This permits a reduction both in the number of ports in the optical space switch and the number of optical fibers used to reach the servers. This architecture is a hybrid packet/optical switching architecture. The drawback of this system is that a power consuming electrical packet switching layer is still used in conjunction with the optical switching layer.

SUMMARY

In a first aspect there is provided a wavelength selective optical switching arrangement comprising a set of input ports, a set of output ports a switching matrix and a plurality of de-multiplexers each comprising an aggregate port and a plurality of tributary ports, each aggregate port being connected to an input port and each tributary port being connected to the switching matrix, the switching matrix being coupled between the tributary ports and the output ports. The wavelength selective optical switching arrangement is configured to receive at an input port a group of optical signals, each optical signal being transmitted on a different wavelength and being assigned to one of a plurality of destination nodes, de-multiplex the group of optical signals in a said de-multiplexer, re-group the optical signals into destination groups according to their destination node and route each destination group to a respective output port assigned to the destination group.

In an embodiment, the switching matrix is configurable to group optical signals of different wavelengths on output ports.

In an embodiment, the switching matrix comprises an optical grid comprising a set of first optical links in a first direction and a set of second optical links in a second direction, the set of first optical links being optically connected to the tributary ports and the set of second optical links being optically connected to the output ports, the 2×2 optical switches being located at nodes of the optical grid, each switch connecting a first optical link to a second optical link and being configured to receive an optical signal at a specified wavelength on the first optical link and being configurable between a first configuration in which the optical signal is passed along the first optical link and a second configuration in which the optical signal is diverted to the second optical link.

In an embodiment, the 2×2 switches are micro-ring resonators.

In an embodiment, the wavelength selective optical switching arrangement further comprises a multi-wavelength transceiver module for receiving a set of input signals, assigning wavelengths to those signals and transmitting the signals as optical signals using the assigned wavelengths.

In an embodiment, the wavelength selective optical switching further comprises a multi-wavelength transceiver module comprising a plurality of fixed wavelength transceivers, a plurality of electrical connectors, and an electrical cross-connect, the electrical cross-connect being configured to route signals from the electrical connectors to respective fixed wavelength transceivers assigned to respective connectors.

In an embodiment, the wavelength selective optical switching device further comprises a multi-wavelength transceiver module comprising a plurality of tuneable transceivers and a plurality of electrical connectors, wherein each electrical connector is directly connected to a tuneable transceiver.

In a second aspect, there is provided an optical switching system comprising a plurality of wavelength selective optical switching arrangements according to any preceding claim and an optical space switch comprising a plurality of input ports and a plurality of output ports, the space switch being configurable to provide a plurality of optical paths through the matrix, each path linking an input port with an output port. A subset of the output ports of each wavelength selective optical switching arrangement are optically connected to input ports of the optical space switch and a subset of the input ports of each wavelength selective optical switching arrangement are optically connected to output ports of the optical space switch and the optical switching system is configured to provide optical paths for transporting groups of optical signals between wavelength selective optical switching arrangements, wherein each group of optical signals comprises one or more optical signals, each optical single being transmitted using a different wavelength.

In an embodiment each wavelength selective optical switching arrangement has a plurality of output ports connected to respective input ports of the optical space switch and a single input port connected to a single output port of the space switch.

In an embodiment each wavelength selective optical switching arrangement is configured to group optical signals with a common destination and route the optical signals to an assigned output port.

In a third aspect there is provided a method of routing a plurality of optical signals transmitted using different wavelengths through a network, the network comprising a plurality of nodes, wherein each node may be a source node, a destination node or both. the method comprises at a wavelength selective optical switching device comprising a plurality of input ports and a plurality of output ports receiving at an input port a group of optical signals from a source node, de-multiplexing the group of optical signals, identifying a destination node for each of the optical signals, assigning a respective output port for each destination node, re-grouping the optical signals into destination groups according to their destination node and routing each destination group to the respective output port. Optionally, the network is a data center network.

In an embodiment, the method further comprises, at an optical space switch comprising a plurality of input ports and output ports, receiving a group of optical signals from a wavelength selective optical switching arrangement connected to a source node and routing the group to a wavelength selective switch connected to a destination node.

In an embodiment the method further comprises at a wavelength selective space switch associated with a destination node receiving one or more groups of optical signals on respective input ports, de-multiplexing each of the one or more groups of optical signals, re-grouping the optical signals into a single aggregate signal and routing the aggregate to an output port.

In a fourth aspect there is provided a controller for a network comprising a transmitter for transmitting instructions to network devices, a receiver for receiving requests for data flows, a memory and a processor. The processor is configured to receive a request to transmit a data flow from a source node to a destination node, schedule the data flow, assign a wavelength to the data flow, provide an instruction to a multi-wavelength transceiver at the source node to transmit the data flow on an optical signal using the wavelength to a wavelength selective optical switching device at the source node, provide an instruction to the wavelength selective optical switching device at the source node to route the optical signal to a port of an optical space switch, provide the optical space switch with an instruction to route the data flow to a wavelength selective device at the destination node, provide an instruction to the wavelength selective switching device at the destination node to route the optical signal to a multi-wavelength transceiver at the destination node and provide an instruction to the multi-wavelength transceiver at the destination node to route the optical signal to the destination node.

In a fifth aspect there is provided a method of routing data flows through a network, the method comprising the steps of, at a network controller, receiving a request to transmit a data flow from a source node to a destination node, scheduling the data flow; assigning a wavelength to the data flow, providing an instruction to a multi-wavelength transceiver at the source node to transmit the data flow on an optical signal using the wavelength to a wavelength selective optical switching device at the source node, providing an instruction to the wavelength selective optical switching device at the source node to route the optical signal to a port of an optical space switch, providing the optical space switch with an instruction to route the data flow to a wavelength selective device at the destination node, providing an instruction to the wavelength selective switching device at the destination node to route the optical signal to a multi-wavelength transceiver at the destination node and providing an instruction to the multi-wavelength transceiver at the destination node to route the optical signal to the destination node.

In a fifth aspect there is provided a method of grouping and routing a plurality of wavelengths from a multi-wavelength aggregate, the method comprising the steps of de-multiplexing the multi-wavelength aggregate and routing each wavelength to one of a plurality of output ports.

In an embodiment, the step of routing comprises switching, by means of a 2×2 switch, each wavelength from a first optical link associated with an input port to a second optical link associated with an output port.

A further aspect provides a controller for a network comprising a receiving unit for receiving a request to transmit a data flow from a source node to a destination node; and a scheduling unit for scheduling the data flow. The controller further comprises a first providing unit for providing an instruction to a multi-wavelength transceiver at the source node to transmit the data flow on an optical signal using the wavelength to a wavelength selective optical switching device at the source node and a second providing unit for providing an instruction to the wavelength selective optical switching device at the source node to route the optical signal to a port of an optical space switch. The controller further comprises a third providing unit for providing the optical space switch with an instruction to route the data flow to a wavelength selective device at the destination node and a fourth providing unit for providing an instruction to the wavelength selective switching device at the destination node to route the optical signal to a multi-wavelength transceiver at the destination node. The controller further comprises a fifth providing unit for providing an instruction to the multi-wavelength transceiver at the destination node to route the optical signal to the destination node.

In some aspects, a wavelength selective switching arrangement comprises a receiving unit for receiving one or more groups of optical signals on respective input ports; a de-multiplexing unit for de-multiplexing each of the one or more groups of optical signals; a re-grouping unit for re-grouping the optical signals into a single aggregate signal; and a routing unit for routing the aggregate to an output port.

In some aspects, a wavelength selective optical switching arrangement comprises a receiving unit for receiving at an input port a group of optical signals from a source node, and a de-multiplexing unit for de-multiplexing the group of optical signals. The arrangement comprises an identifying unit for identifying a destination node for each of the optical signals; an assigning unit for assigning a respective output port for each destination node; a re-grouping unit for re-grouping the optical signals into destination groups according to their destination node; and a routing unit for routing each destination group to a respective output port.

In some aspects, an optical switching system for routing a plurality of optical signals transmitted using different wavelengths through a network comprising a wavelength selective optical switching arrangement according to an example and further comprising an optical space switch comprising: a plurality of input ports and output ports; a receiving unit for receiving a group of optical signals from a wavelength selective space switch associated with a source node; and a routing unit for routing the group to a wavelength selective switch associated with a destination node.

BRIEF DESCRIPTION OF FIGURES

The above and other aspects of the present invention will now be described by way of example only, with reference to the following figures.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art.

The present disclosure provides an optical circuit switched network which optimizes power consumption and simplifies optical cabling. An aim is the removal of the top of rack packet switches. In their place, each "compute node" comprises a network interface chip (NIC), which is directly connected to the optical switching layer. A wavelength is assigned to each compute domain. Wavelengths are switched so as to group wavelengths with a common destination prior to transmission to an optical space switch.

Figure 1:
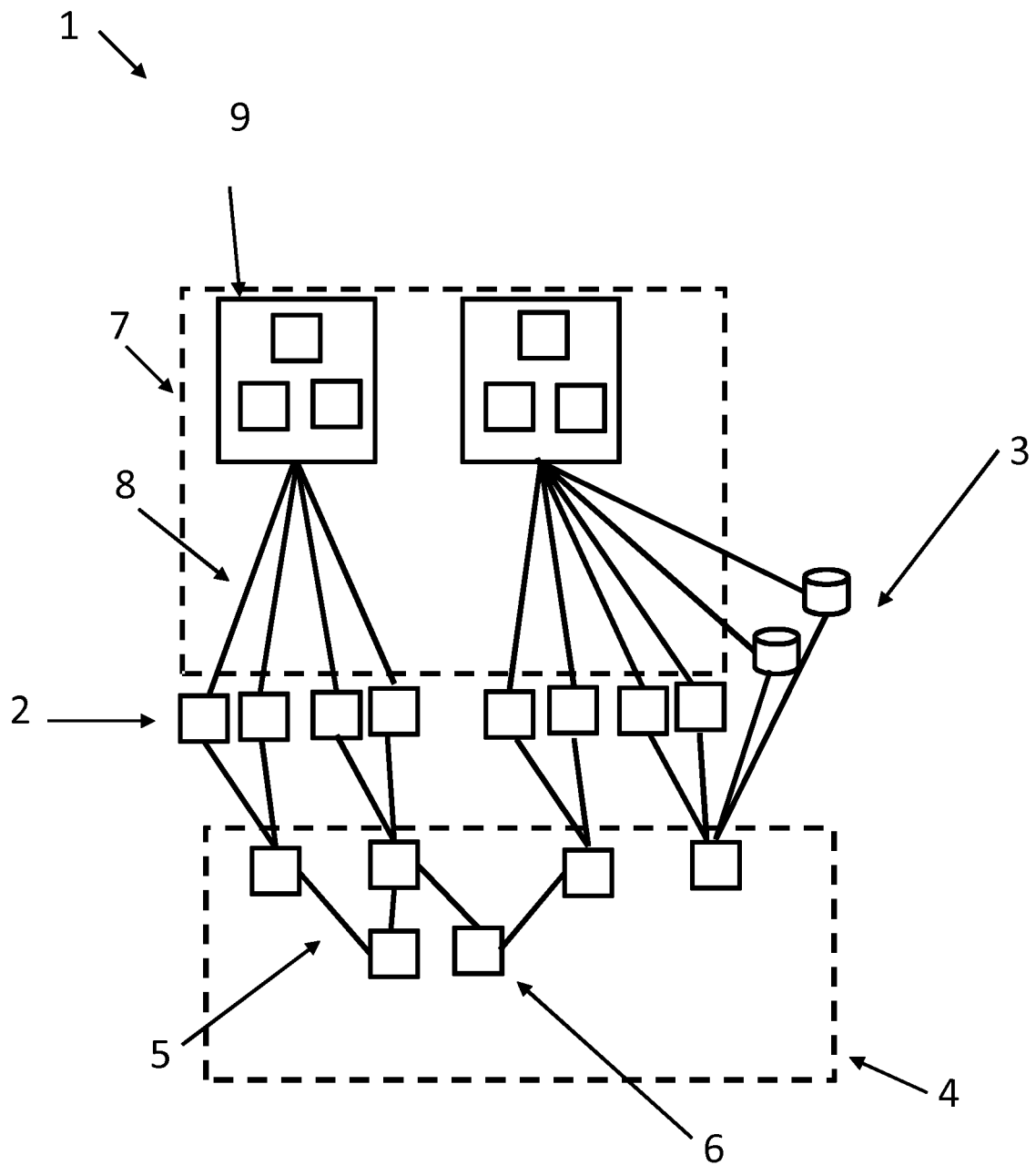
FIG. 1 is a schematic diagram of a data center architecture 1 according to the prior art.
Figure 2:
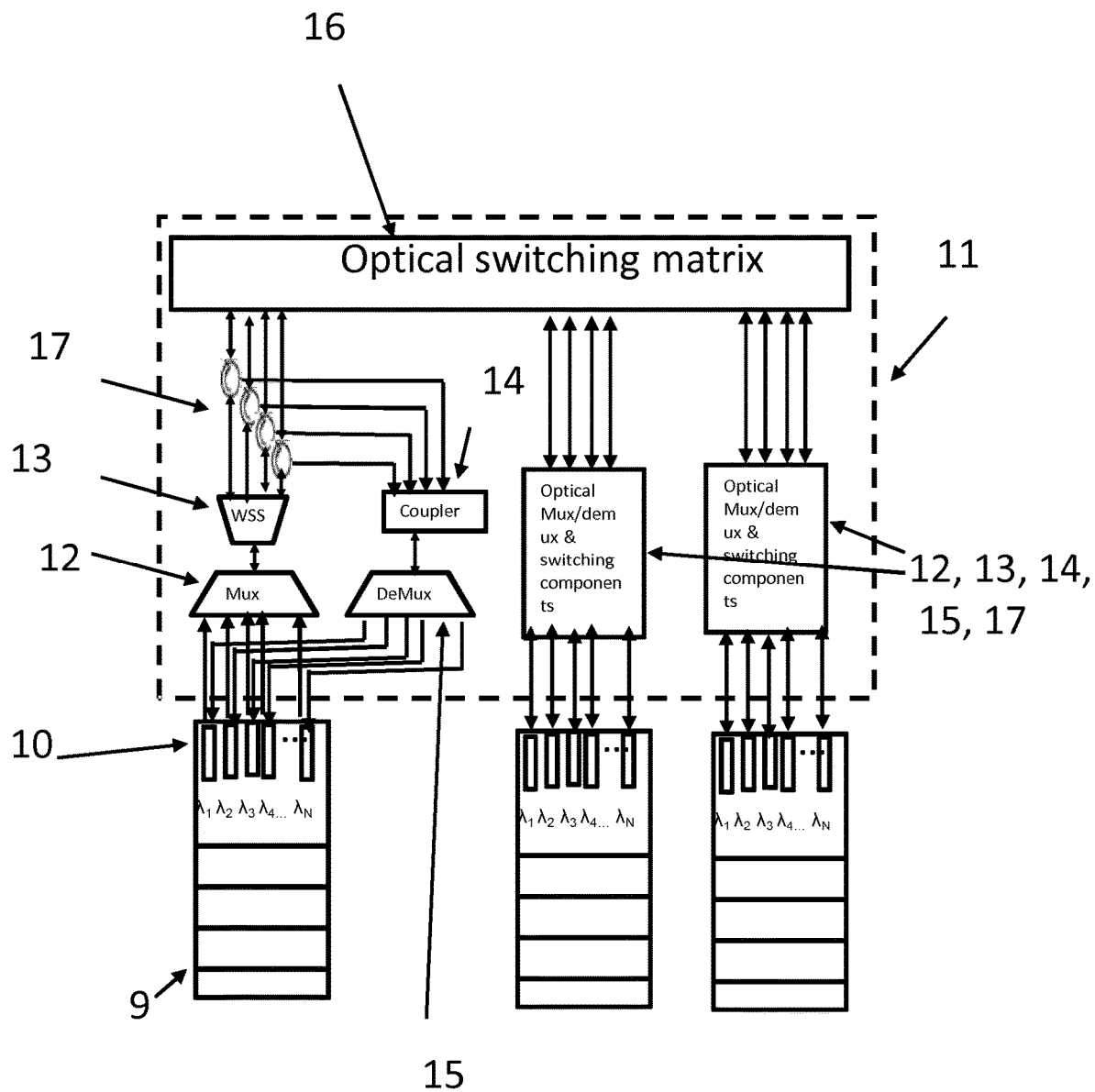
FIG. 2 is a schematic diagram of a data center architecture 1 according to the prior art.
Figure 3:
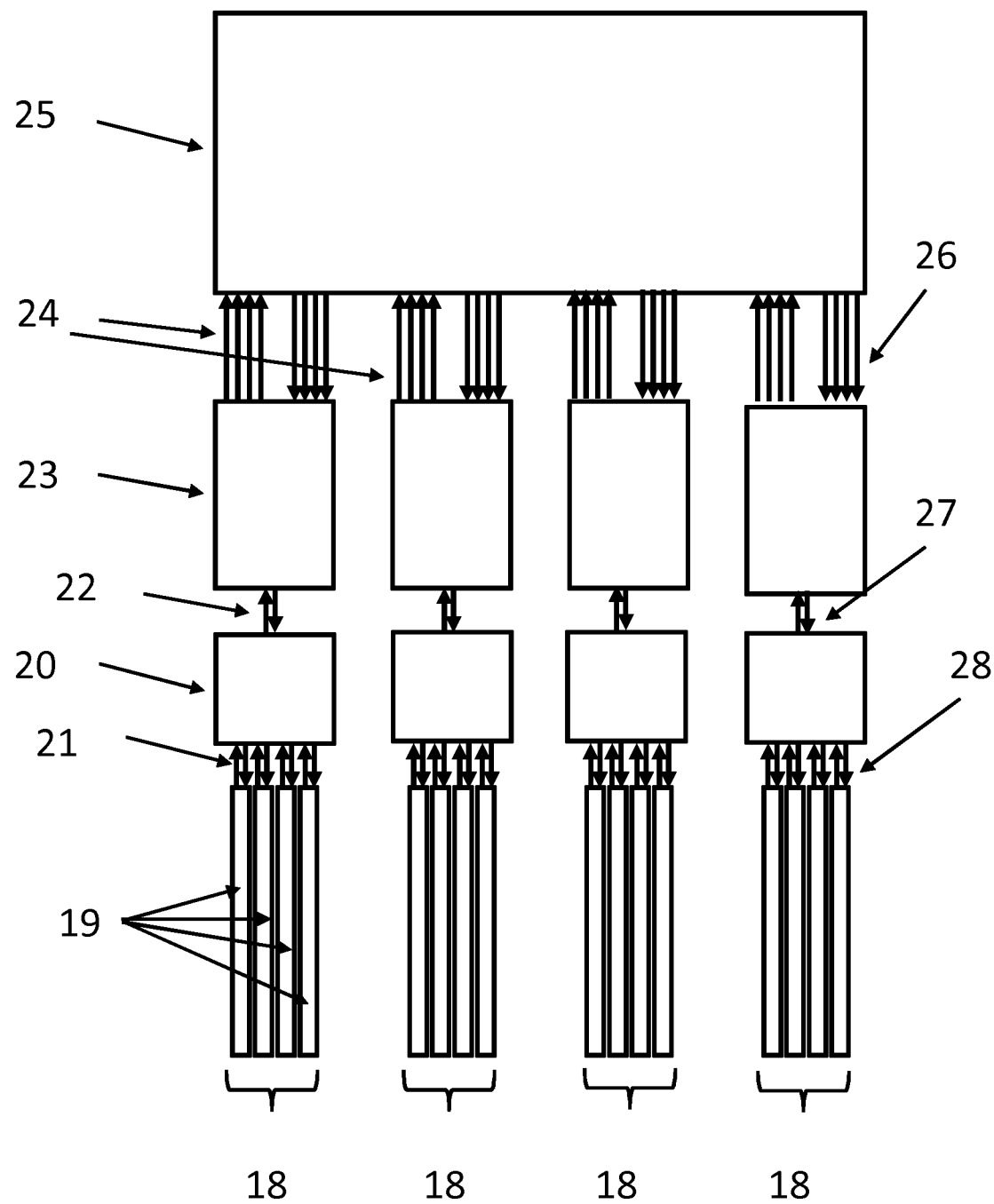
FIG. 3 is a schematic diagram of a data center network architecture according to an embodiment.

FIG. 3 is a schematic diagram of a data center network architecture according to an embodiment. The data center comprises a plurality of "compute nodes" 19, which may comprise a single server. These compute nodes are grouped into "compute domains" 18. Each compute domain is connected to a wavelength selective device 20, which assigns a wavelength to each compute node. Electrical signals (or optionally grey-optical) 21 comprising data from the compute nodes are passed to the wavelength selective device 20 which then transmits the data received from the compute nodes on optical signals using the wavelengths assigned to the computer nodes. The optical signals are then multiplexed together and the resulting aggregate signal 22 is forwarded to a wavelength selective switching device 23.

The purpose of the wavelength selective switching device 23 is to group together optical signals which have the same destination compute domain. Groups of optical signals 24 having the same destination are output from the wavelength selective switching device 23 and are then forwarded to an optical space switch 25. The optical space switch 25 routes the groups of optical signals to the wavelength selective switching device 23 associated with respective compute domains. The received signals 26 are then multiplexed together and forwarded 27 to the wavelength selective device 20 for the respective compute domain. The latter device detects the optical signals and passes the data 28 to the respective compute node.

Figure 4:
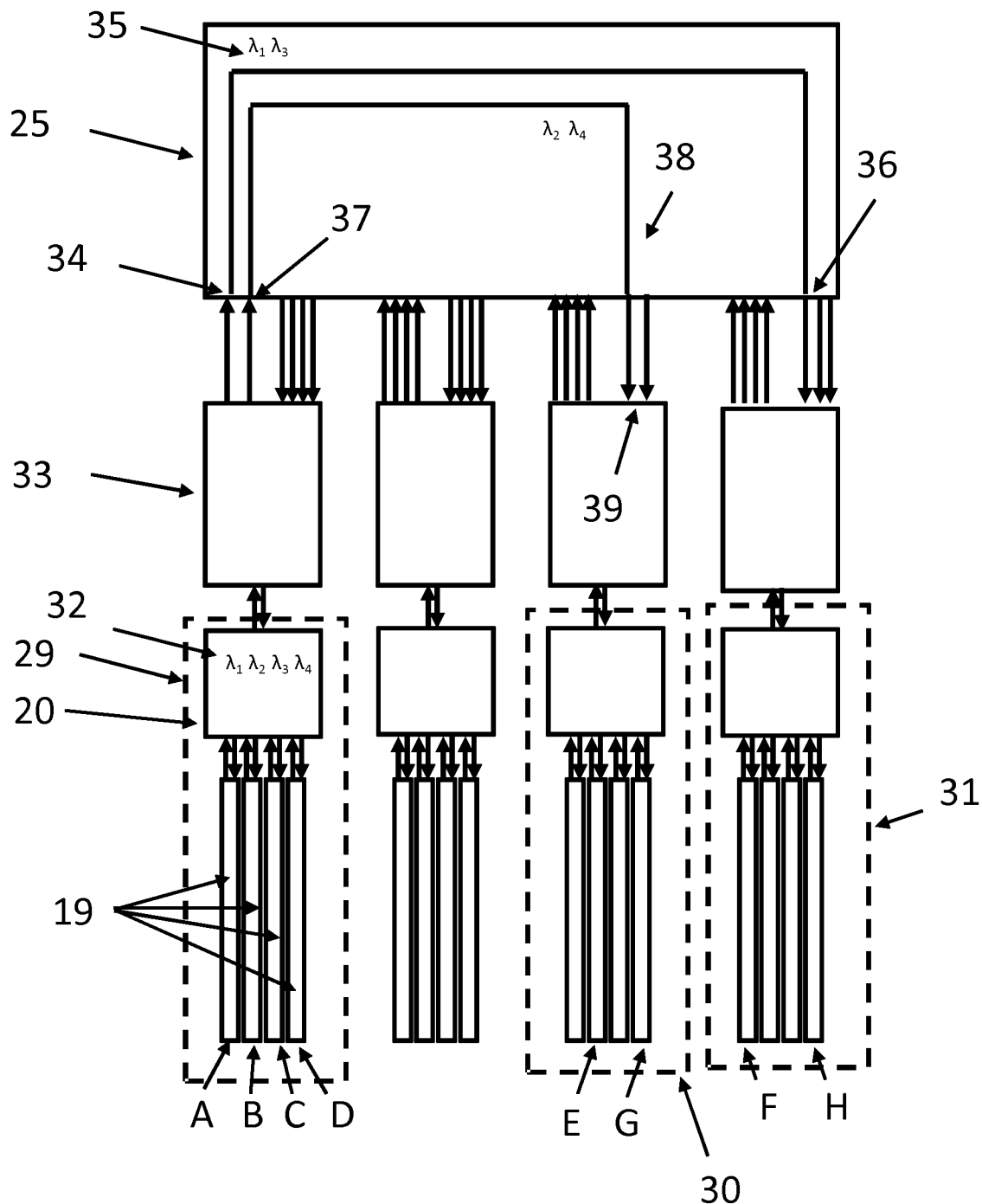
FIG. 4 is a schematic diagram illustrating an example of the operation of the wavelength grouping and routing in the architecture of FIG. 3.

FIG. 4 is a schematic diagram illustrating an example of the operation of the wavelength grouping and routing through the optical space switch. Eight compute nodes are involved in transmissions of data. Nodes A, B, C and D, all at a first compute domain 29 are transmitting data respectively to nodes E, F, G and H, where E and G are at a second compute domain 30 and F and H are at a third compute domain 31. At the first compute domain 29, the wavelength selective device 20 assigns wavelengths 32 $\lambda_1$ $\lambda_2$ $\lambda_3$ and $\lambda_4$ to compute nodes A, B, C and D respectively. Compute nodes A and C are both transmitting to the third compute domain 31. $\lambda_1$ and $\lambda_3$ are therefore routed together. The wavelength selective switching device 33 for the first compute domain 29 routes these two wavelengths to a first port 34 on the optical space switch 25, whereupon $\lambda_1$ and $\lambda_3$ are transmitted along a first optical path 35 through the optical space switch to a first port 36 at the third compute domain 31. Compute domains B and D are both transmitting to the second compute domain 30. $\lambda_2$ and $\lambda_4$ are therefore routed together. The wavelength selective optical switching device 33 for the first compute domain 29 routes these two wavelengths to a second port 37 on the optical space switch 25, whereupon $\lambda_2$ and $\lambda_4$ are transmitted along a second optical path 38 through the optical space switch to a second port 39 at the second compute domain 30. Typically, the wavelength selective switching device 23 groups wavelengths according to destination. The groups of wavelengths are then forwarded to the optical space switch 25. Once a wavelength has been assigned to a compute node, the two stages of switching enable data flows to be grouped together. Each data flow is transmitted on an assigned wavelength. The first switching stage groups the wavelengths for different data flows destined for the same destination (i.e. grouped by the wavelength selective optical switching device 33, using wavelengths generated by the wavelength selective device 20). The groups of wavelengths can then be switched together in the optical space switch. This has the advantage of simplifying the switching and reducing the amount of switching to a minimum. The optical space switch routes the optical signals based on the input port of the optical space switch at which they are received.

Figure 5:
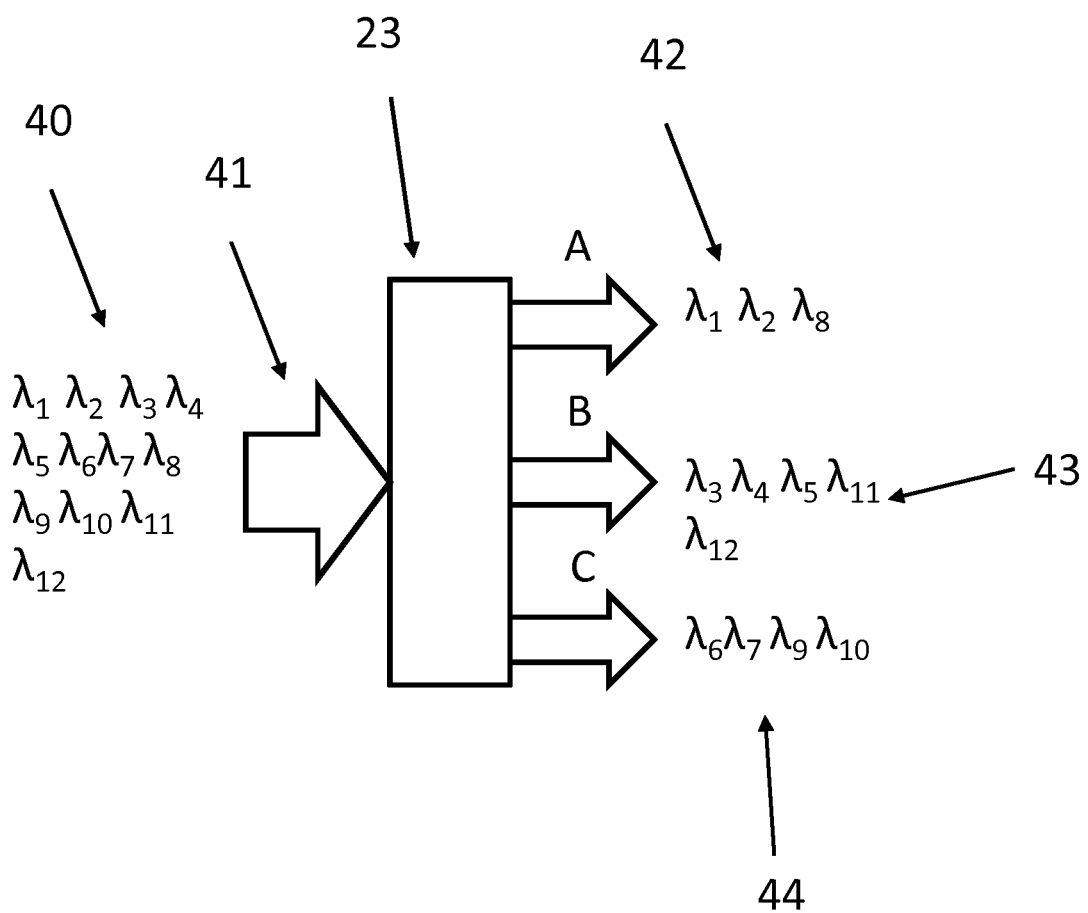
FIG. 5 is a schematic diagram of the operation of a wavelength selective switching device according to an embodiment.
Figure 6:
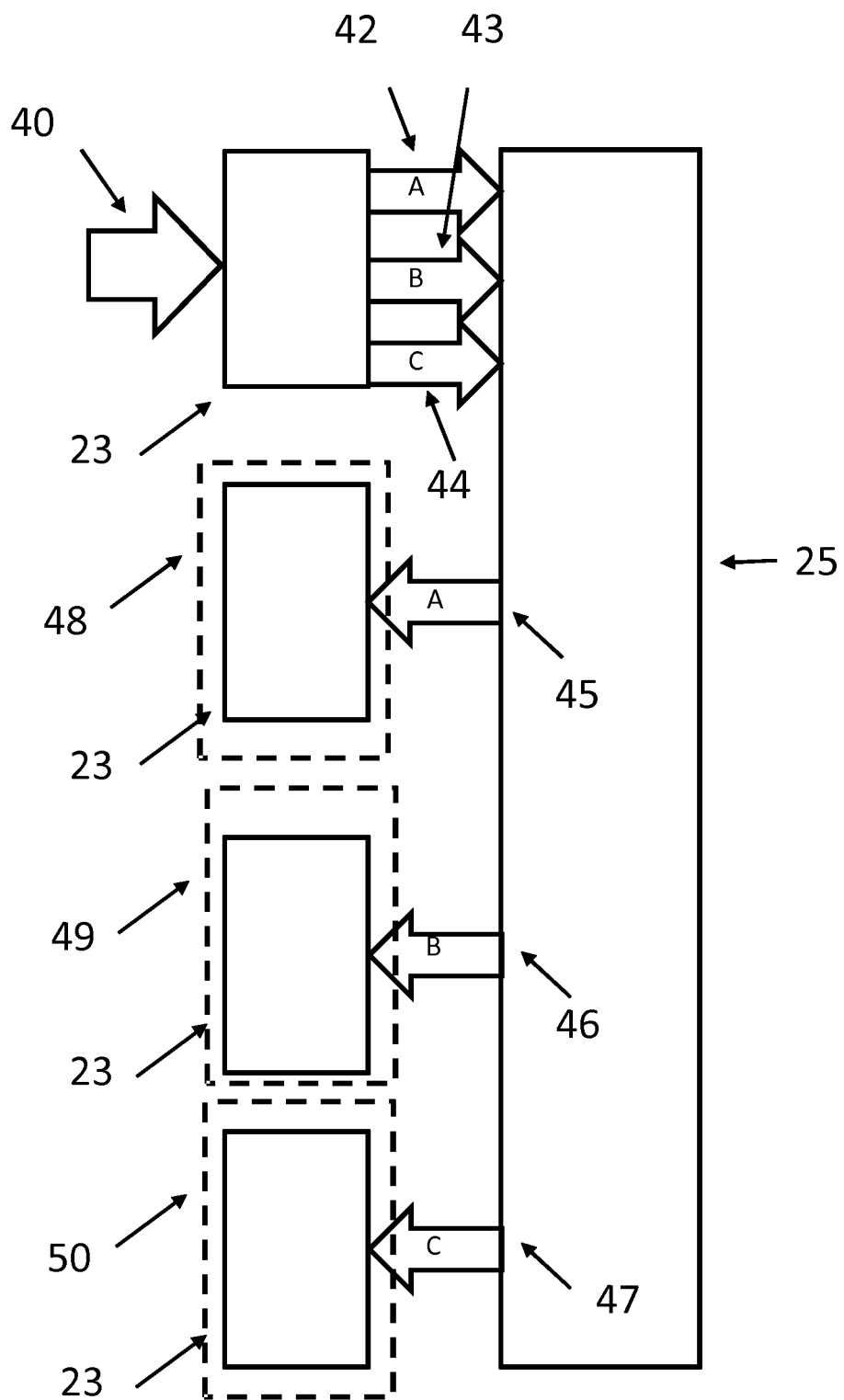
FIG. 6 is a schematic diagram of the operation of an optical switching system according to an embodiment.

FIGS. 5 and 6 illustrate the two stages of switching. FIG. 5 is a schematic diagram of the operation of a wavelength selective switching device according to an embodiment. In the example, 12 wavelengths are shown, but the person skilled in the art will recognize that any number of wavelengths may be used. The 12 wavelengths 40 are input 41 into the wavelength selective switching device 23. The wavelength selective switching device 23 groups the wavelengths and routes the groups to appropriate output ports. In this example, three groups of wavelengths A, B and C, wherein wavelengths $\lambda_1$, $\lambda_2$ and $\lambda_8$ form group A 42, wavelengths $\lambda_3$, $\lambda_4$, $\lambda_5$, $\lambda_{11}$ and $\lambda_{12}$ form group B 43 and wavelengths $\lambda_6$, $\lambda_7$, $\lambda_9$ and $\lambda_{10}$ form group C 44.

FIG. 6 is a schematic diagram of the operation of an optical switching system according to an embodiment. The example illustrates the routing of the wavelength groups from the example in FIG. 4. The wavelength groups 42, 43, 44 are routed to output ports 45, 46, 47 in the switching matrix 25. The switching matrix then routes the groups to the wavelength selective switching devices 23 at their respective destination nodes 48, 49, 50.

Figure 7:
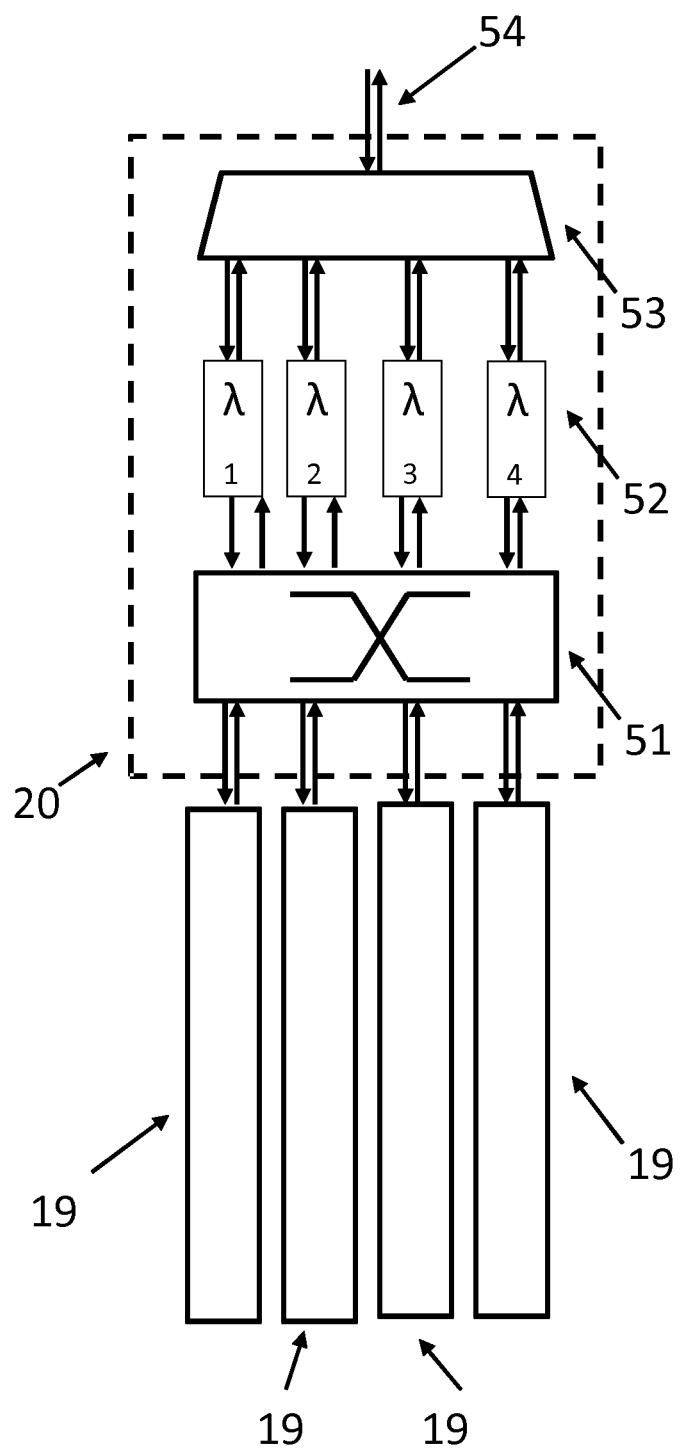
FIG. 7 is a schematic diagram showing an arrangement with fixed wavelength transceivers according to an embodiment.

In an embodiment, an assignment of wavelengths is performed by means of a plurality of fixed wavelength transceivers. FIG. 7 is a schematic diagram showing this arrangement. A plurality of compute nodes 19 have wavelengths assigned to them using wavelength selection device 20. In order to be able to assign different wavelengths to the compute nodes, an electrical cross-connect 51 is provided, which routes data flows from the compute nodes 19 to the fixed wavelength transceivers 52. The optical signals from the transceivers are then multiplexed by multiplexer 53 and output to computer node port 54.

Figure 8:
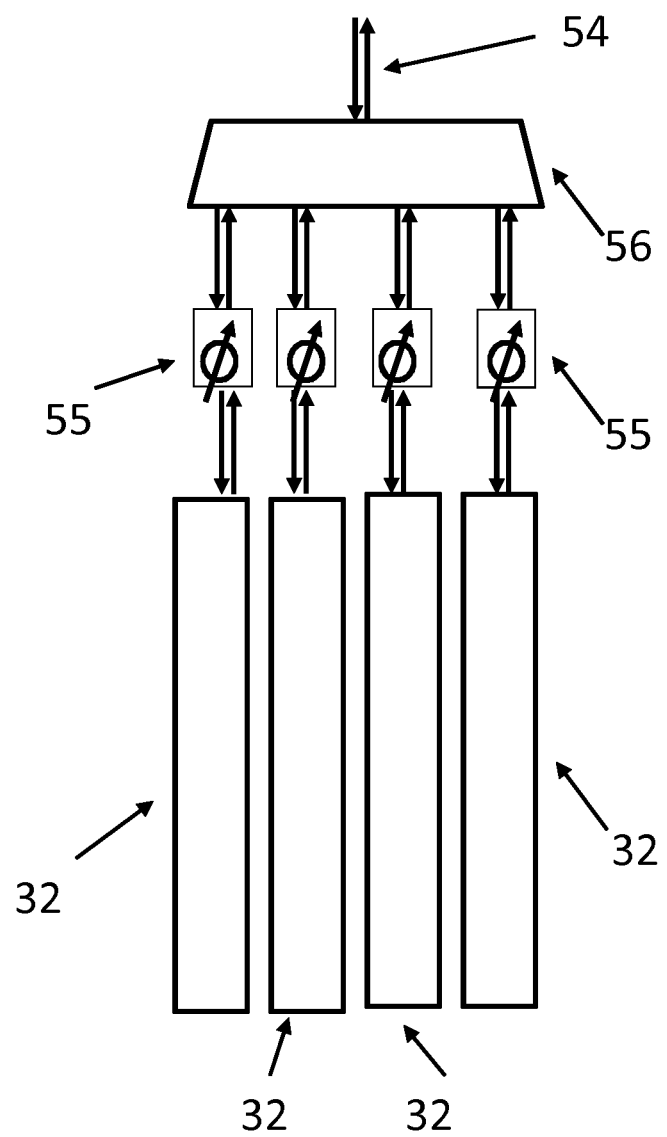
FIG. 8 is a schematic diagram showing an arrangement with tuneable transceivers according to an embodiment.

As shown in the example of FIG. 8, the wavelength selective device comprises tuneable transceivers. The tuneable transceivers are used instead of a cross connect to assign wavelengths A plurality of compute nodes 19 are directly connected to a plurality of tuneable transceivers 54. The tuneable transceivers have an optical wavelength which is variable and controlled (i.e. tuned) to an assigned wavelength on receipt of an instruction from a network controller. A plurality of different wavelengths are then combined onto a single optical path by means of an optical combiner 55.

Figure 9:
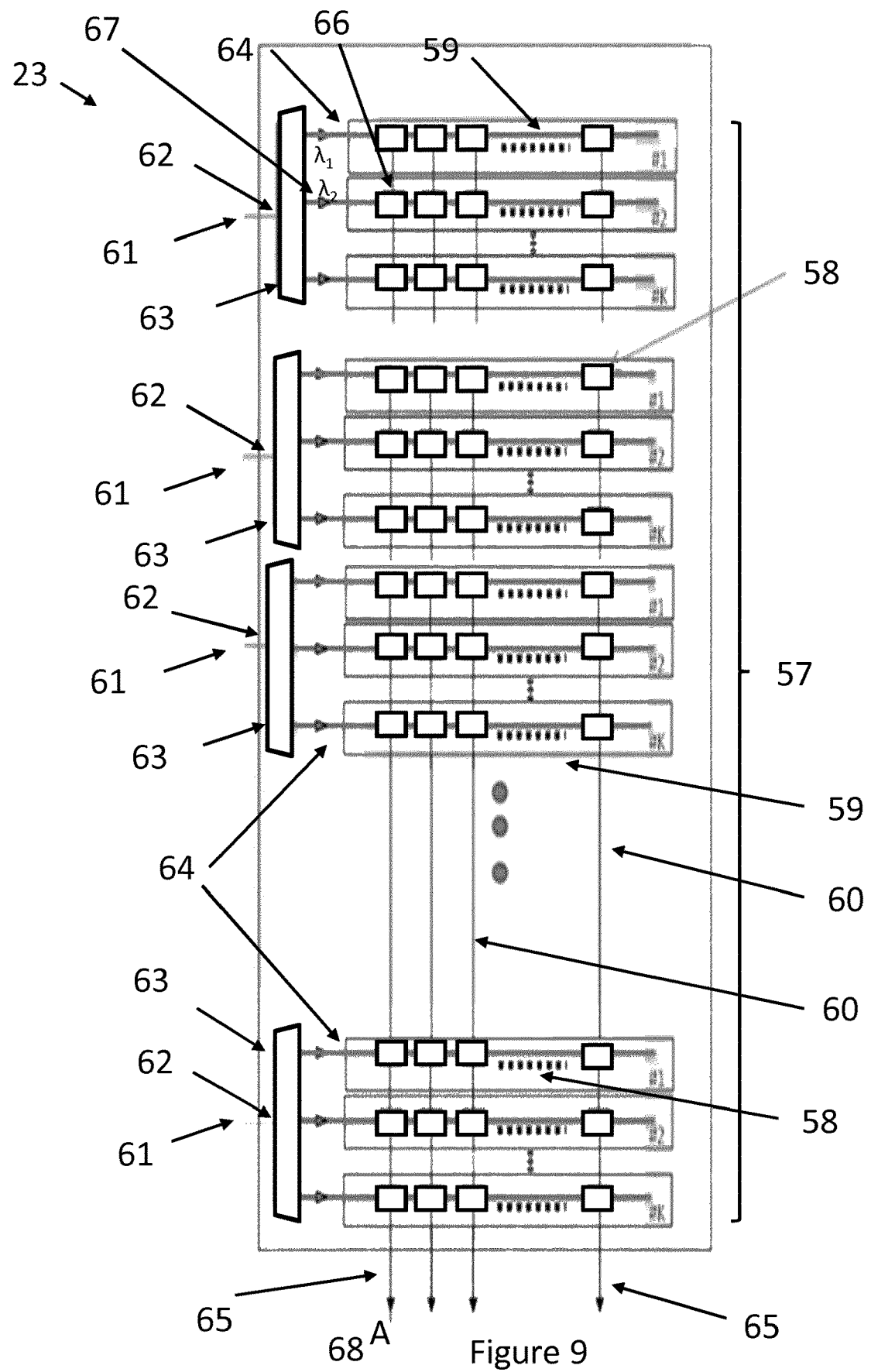
FIG. 9 is a schematic diagram showing a switching matrix using 2×2 switches according to an embodiment.

FIG. 9 shows an embodiment, in which the switching matrix 57 is provided by an array of 2×2 optical switches. The switching matrix 57 is provided in the form of an array of 2×2 switches 58, arranged so that they are part of a first set of first direction optical links 59 (shown here as horizontal) and a second set of second direction optical links 60 (shown here as vertical), wherein the first and second directions may be considered as orthogonal or substantially perpendicular to each other as shown. The first direction optical links are connected to a tributary port 64 of a de-multiplexer 63. The second direction links are connected to output ports of the wavelength selective optical switching device 20. Input ports 61 of the wavelength selective optical switching device, which in an embodiment receive an input from compute domain output port 54 (see FIGS. 7 and 8) are connected to aggregate ports 62 of the de-multiplexers 63. The plurality of tributary ports 64 are for the de-multiplexed wavelengths, and the aggregate port 62 is for the multiplexed wavelengths. The tributary ports 64 of the de-multiplexers are connected to respective first direction optical links 59. Each of the 2×2 optical switches can be switched between a first position in which they pass a signal along the first direction optical path and a second position in which they divert the signal to a second direction optical link 60, which passes the optical signal to one of a plurality of output ports 65 of the wavelength selective switching device. In an embodiment, the 2×2 switches are wavelength selective. The switches can divert a signal at a well-defined wavelength whilst having no effect on other wavelengths. For example, the switch 66 which connects the $\lambda_2$ terminal 67 of the demultiplexer to output port A 68 is configured to switch $\lambda_2$ but diverting $\lambda_2$ from the first direction to the second direction (horizontal to vertical) has no effect on $\lambda_1$ that can proceed in the second direction in the same column through the switch 66 (coming from the top, in the case in which $\lambda_1$ has been switched too). This property enables wavelength multiplexing along the second direction directions towards the output ports.

Figure 10:
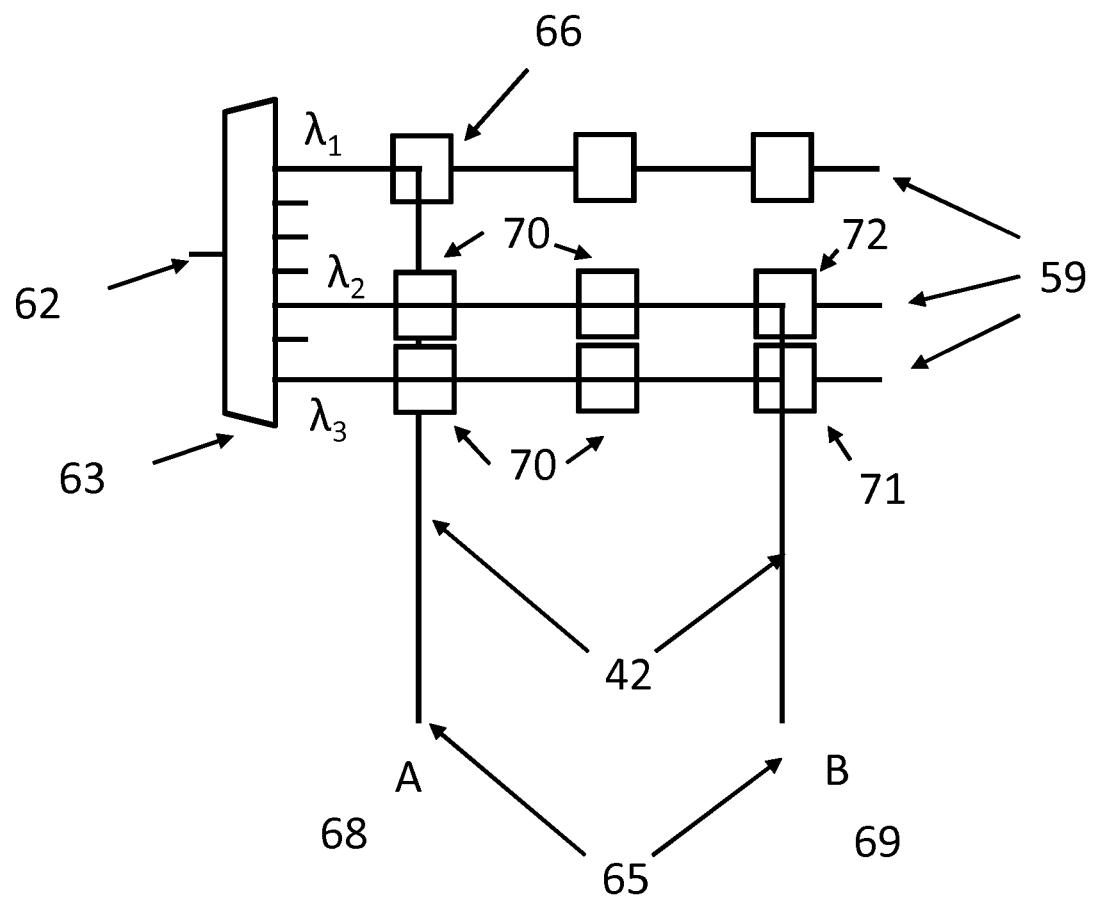
FIG. 10 is a schematic diagram showing the operation of a wavelength selective optical switching device according to an embodiment.

FIG. 10 is a schematic diagram showing the operation of a wavelength selective optical switching device according to the embodiment of FIG. 9. Only a single de-multiplexer 62 is shown for simplicity, and likewise only two output ports 65 and three first direction optical links 59. The switching of three wavelengths, $\lambda_1$, $\lambda_2$ and $\lambda_3$ is illustrated. $\lambda_1$ is to be switched to output port A 68. The 2×2 switch 66 linking the tributary port for $\lambda_1$ and port A 68 is switched to the divert position and the optical signal is sent to port A 68. $\lambda_2$ and $\lambda_3$ are both to be switched to port B 69. To achieve this, the switches 70 along their optical paths are set to pass the signal along the optical paths. Their respective switches leading to port B 71, 72 are set to divert and hence both $\lambda_2$ and $\lambda_3$ are directed to port B 69. In this example, $\lambda_2$ and $\lambda_3$ are grouped on port B 69.

Figure 11:
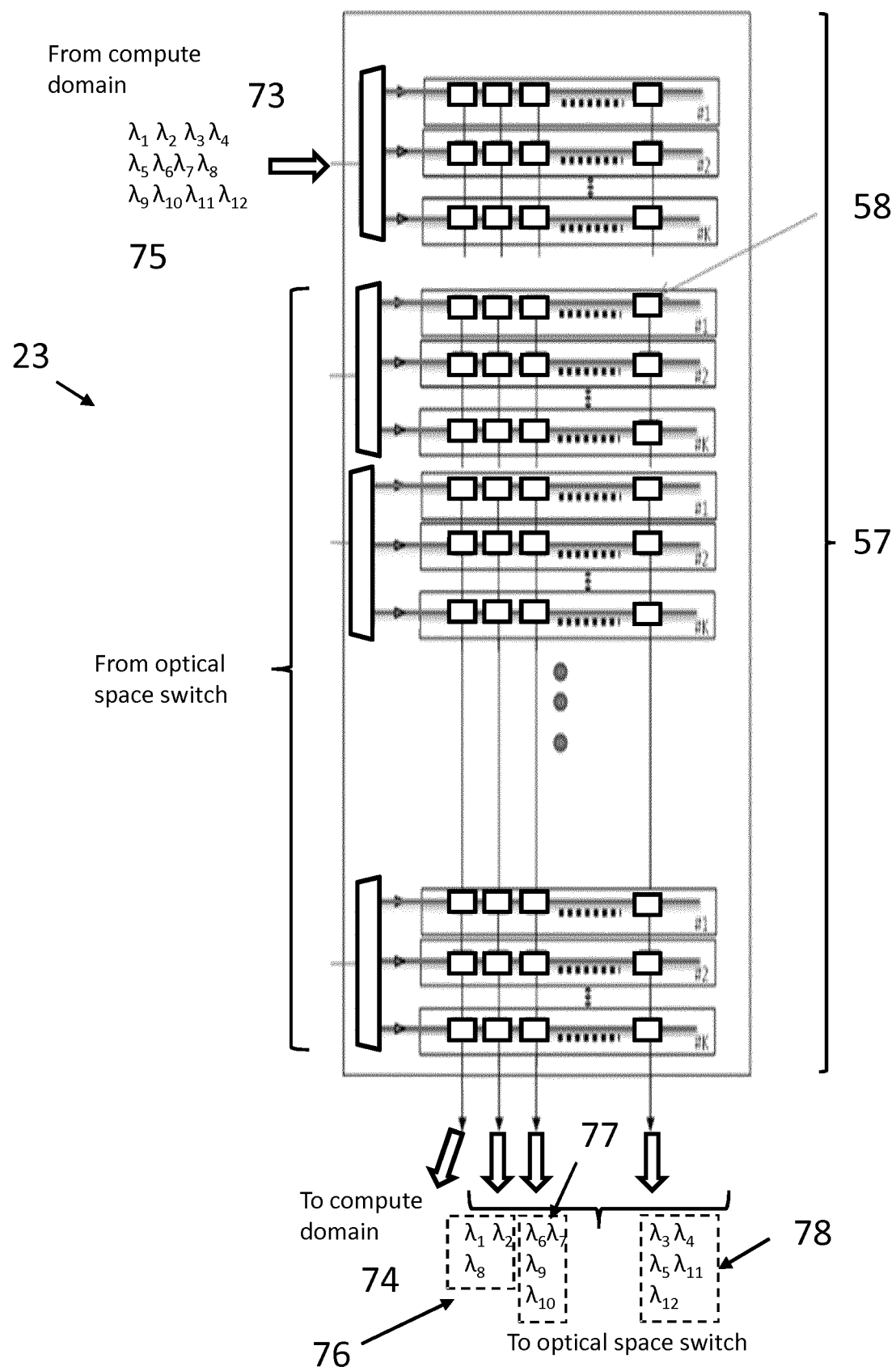
FIG. 11 is a schematic diagram showing the operation of a wavelength selective optical switching device according to an embodiment.

FIG. 11 is a schematic diagram of the use of a wavelength selective optical switching device according to an embodiment. In this embodiment, one input port 73 of the switching device and one output port 74 are connected to a compute domain. All of the other ports are connected to an optical space switch. The example shown illustrates the switching of 12 wavelengths 55 into three groups 76, 77, 78.

Figure 12:
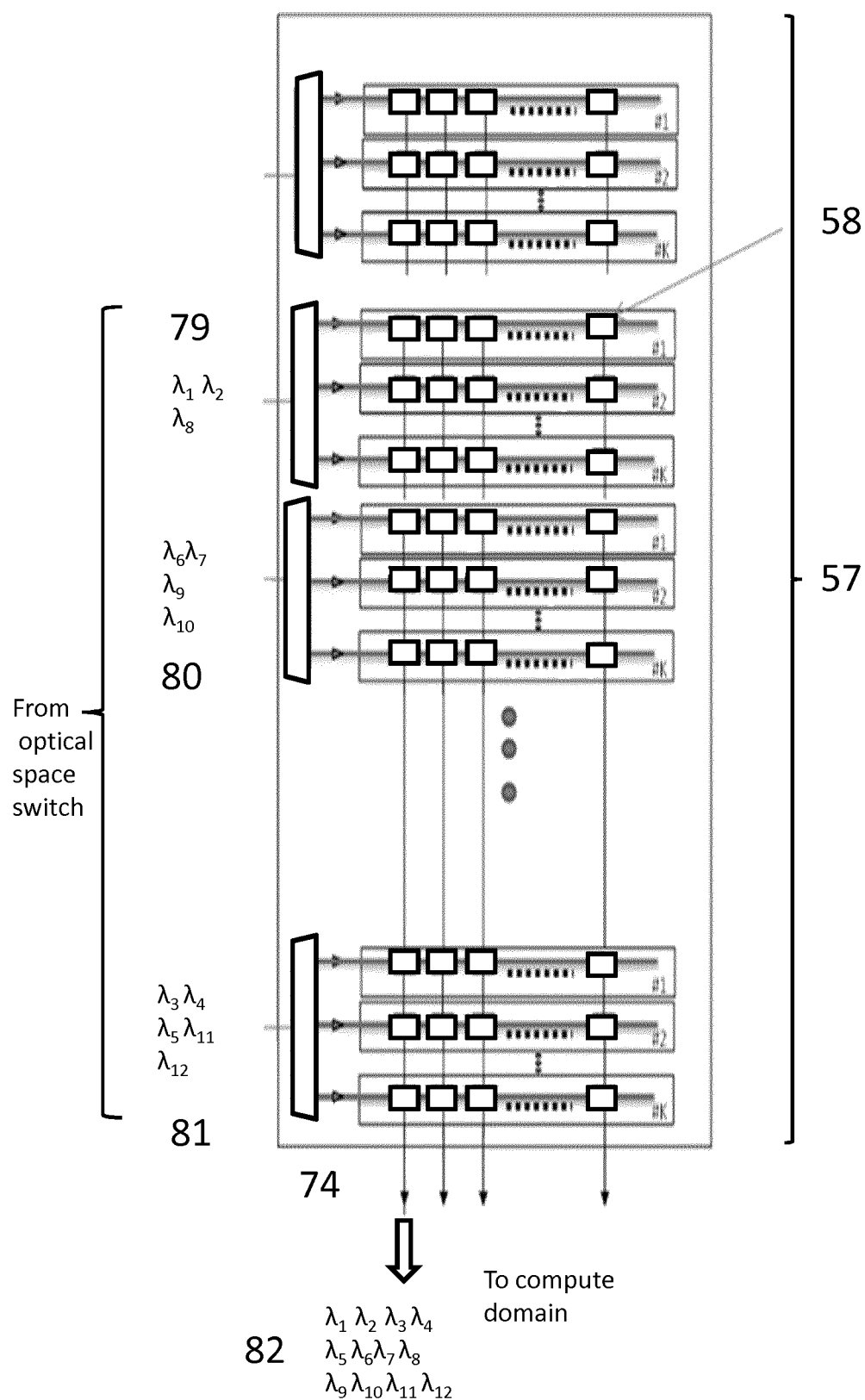
FIG. 12 is a schematic diagram of the use of a wavelength selective optical switching device according to an embodiment.

FIG. 12 is a schematic diagram of the use of a wavelength selective optical switching device according to an embodiment, which illustrates switching in the opposite direction, i.e. signals arriving from the optical space switch and being directed to the compute domain. In the example three groups of wavelengths 79, 80, 81 arrive at respective input ports from the optical space switch. The wavelength groups are grouped together 82 and routed so that all the wavelengths arrive at the output port 74 linked to the compute node. In FIGS. 11 and 12, the example given illustrates 12 wavelengths being switched, with four input and output ports being shown. However, the person skilled in the art will appreciate that the invention is not limited to any particular number of wavelengths or ports.

Figure 13:
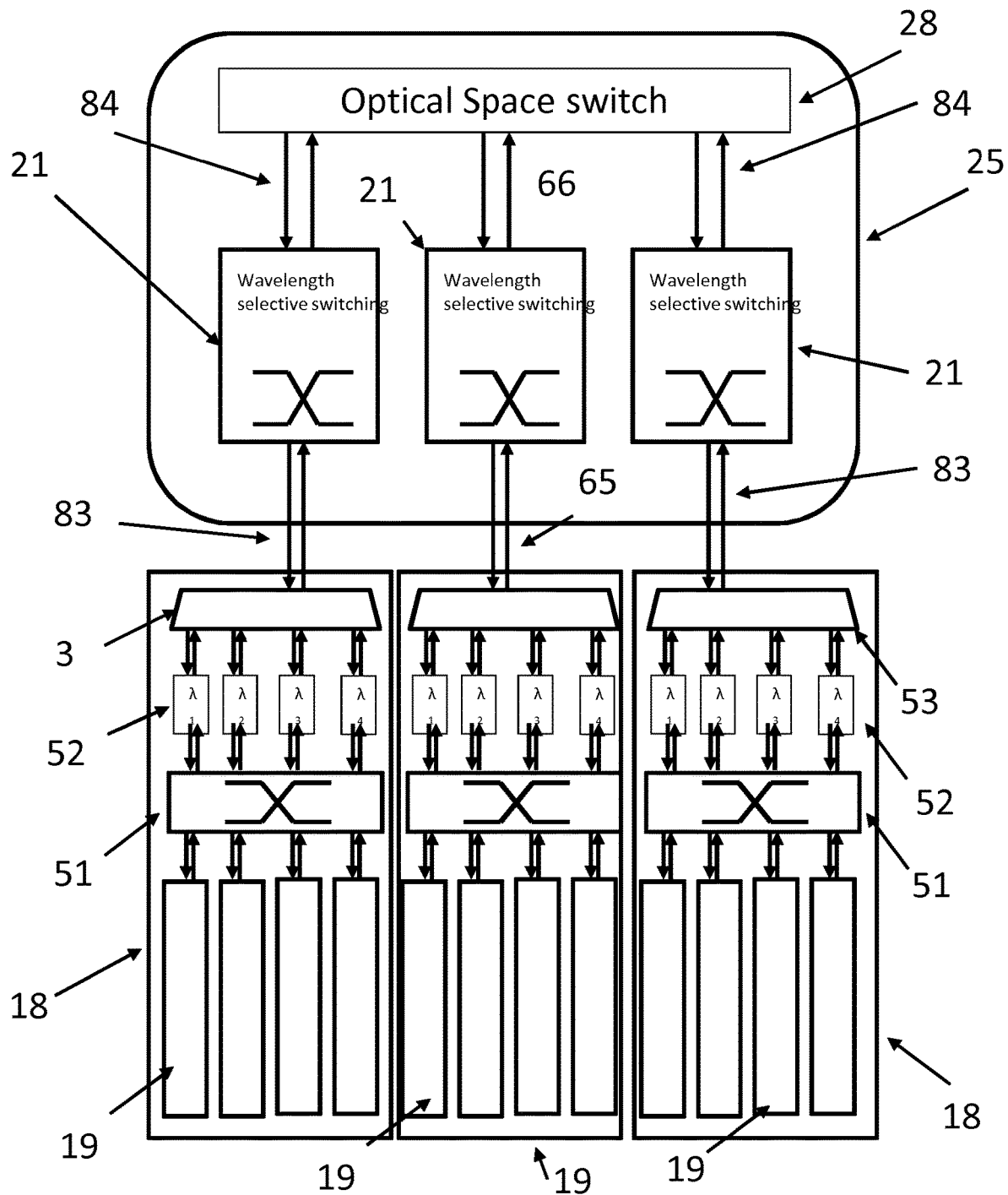
FIG. 13 is a schematic diagram of an optical switching system according to an embodiment.

FIG. 13 is a schematic diagram of an optical switching system according to an embodiment. FIG. 13 illustrates the connection between compute nodes 19 and an optical switching system 25. In the embodiment shown, fixed wavelength transceivers 52 are used in conjunction with a cross-connect 51. However, the skilled person will appreciate that tuneable transceivers may also be used for the wavelength selective device in this arrangement. FIG. 13 illustrates the optical connections 83 between the compute domains 18 and the wavelength selective optical switching devices 20 and the connections 84 between the wavelength selective optical switching devices 23 and the optical space switch 25. In the example of FIG. 12, three compute domains 18 are illustrated. However, the person skilled in the art will appreciate that other numbers of domains may be served by the arrangement, wherein each compute node has its own multi-wavelength module, wavelength switching device and link to the optical space switch. Likewise, the number of compute domains within a compute node may vary. The invention is not limited to any particular number of computer nodes or domains.

Figure 14:
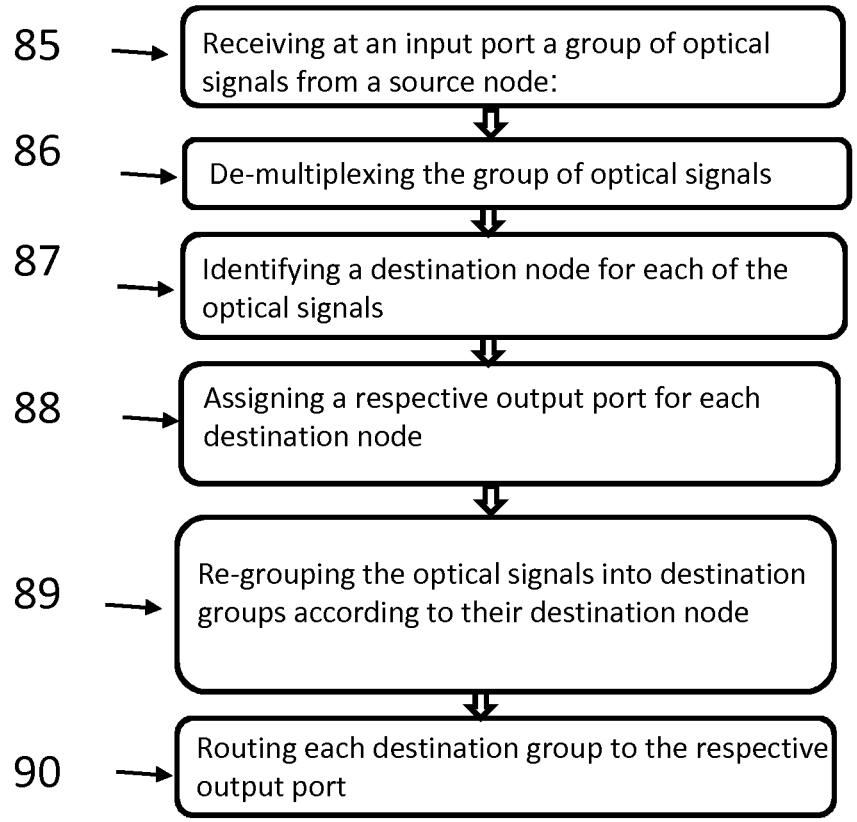
FIG. 14 is a flow chart of a method of routing and grouping optical signals using different wavelengths according to an embodiment.
Figure 15:
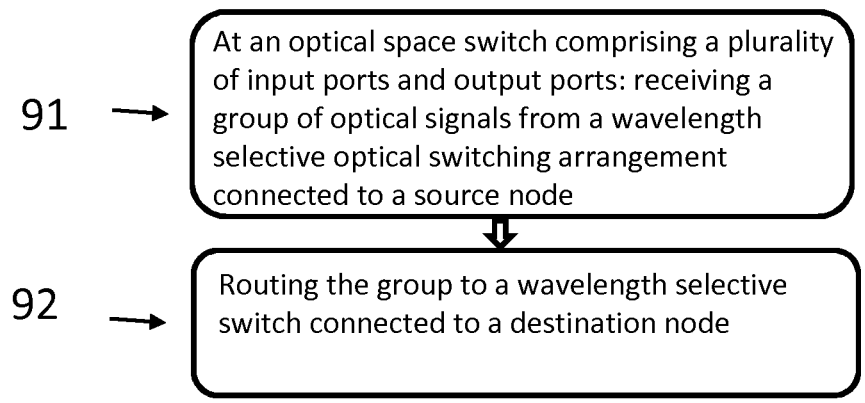
FIG. 15 is a flow chart of a method, according to an embodiment, at an optical space switch.
Figure 16:
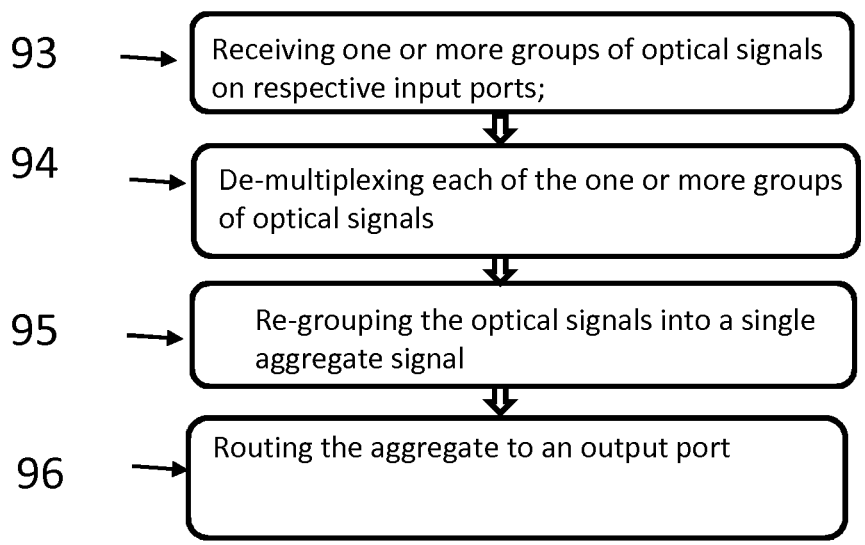
FIG. 16 is a flow chart of a method according to an embodiment at a wavelength selective switching device at a destination node.

FIGS. 14, 15 and 16 are flow charts which illustrate stages of a method of routing signals through a network according to an embodiment, starting at a wavelength selective switching arrangement at a source node, passing through an optical space switch and finishing at a wavelength selective switching arrangement at a destination node.

FIG. 14 is a flow chart of a method of routing and grouping optical signals using different wavelengths according to an embodiment. The method comprises, at a wavelength selective optical switching device comprising a plurality of input ports and a plurality of output ports, receiving 85 at an input port a group of optical signals from a source node, de-multiplexing 86 the group of optical signals, identifying 87 a destination node for each of the optical signals, assigning 88 a respective output port for each destination node, re-grouping 89 the optical signals into destination groups according to their destination node and routing 90 each destination group to the respective output port.

FIG. 15 is a flow chart of a method, according to an embodiment, at an optical space switch comprising, which comprises comprising a plurality of input ports and output ports. The method comprises receiving a group of optical signals from a wavelength selective optical switching arrangement connected to a source node 91 and routing 92 the group to a wavelength selective switch connected to a destination node.

FIG. 16 is a flow chart of a method according to an embodiment at a wavelength selective switching device at a destination node. The method comprises receiving 93 one or more groups of optical signals on respective input ports, de-multiplexing 94 each of the one or more groups of optical signals, re-grouping 95 the optical signals into a single aggregate signal and routing 96 the aggregate to an output port.

Figure 17:
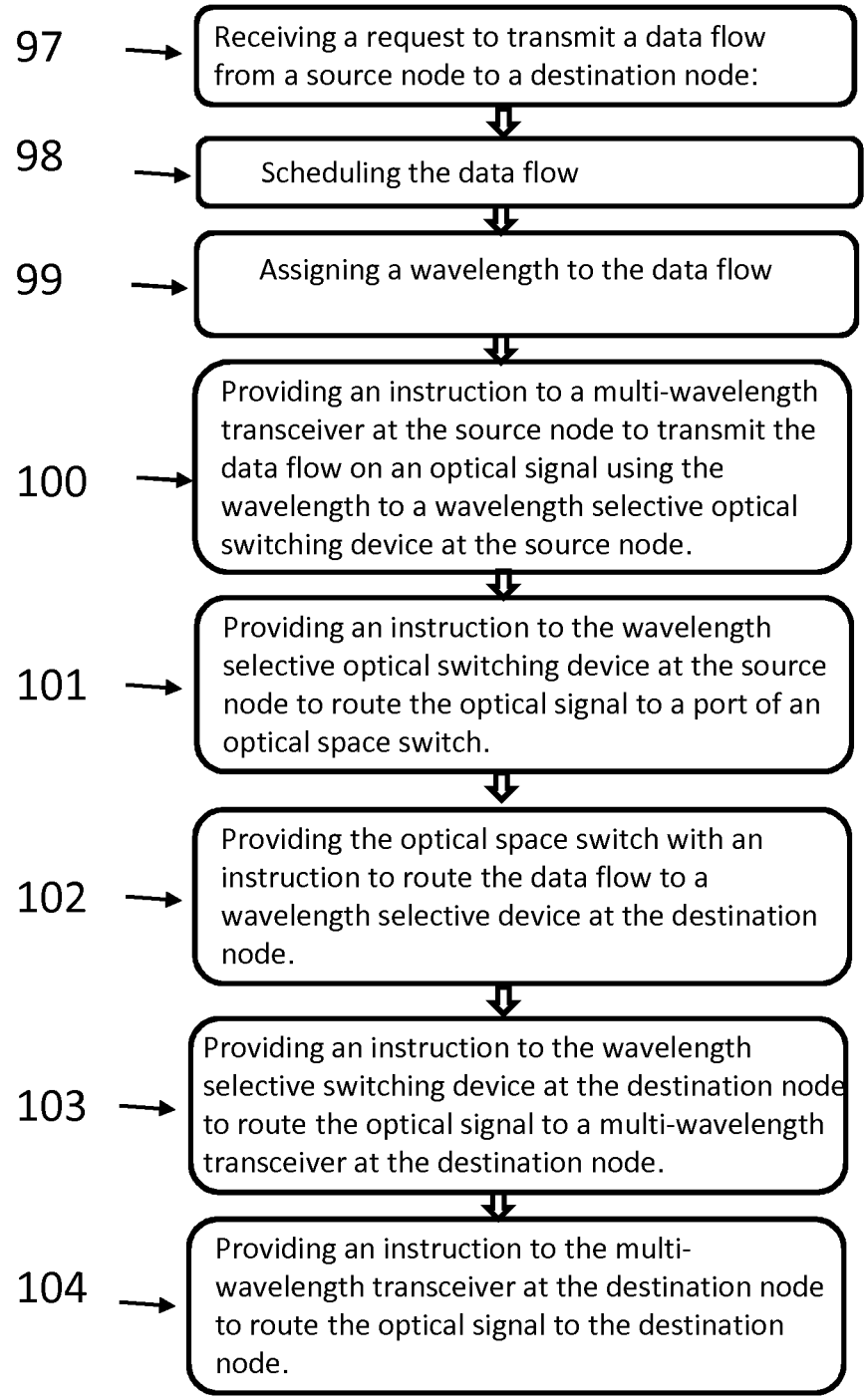
FIG. 17 is a flow chart illustrating a method of routing data flows through a data center network.

FIG. 17 is a flow chart illustrating a method of routing data flows through a data center network. The method comprises, at a network controller, at least some of the features of:

Receiving a request to transmit a data flow from a source node to a destination node 97;
Scheduling the data flow 98;
Assigning a wavelength 99 to the data flow;
Providing 100 an instruction to a multi-wavelength transceiver at the source node to transmit the data flow on an optical signal using the wavelength to a wavelength selective optical switching device at the source node;
Providing 101 an instruction to the wavelength selective optical switching device at the source node to route the optical signal to a port of an optical space switch;
Providing 102 the optical space switch with an instruction to route the data flow to a wavelength selective device at the destination node;
Providing 103 an instruction to the wavelength selective switching device at the destination node to route the optical signal to a multi-wavelength transceiver at the destination node; and
Providing 104 an instruction to the multi-wavelength transceiver at the destination node to route the optical signal to the destination node.

Figure 18:
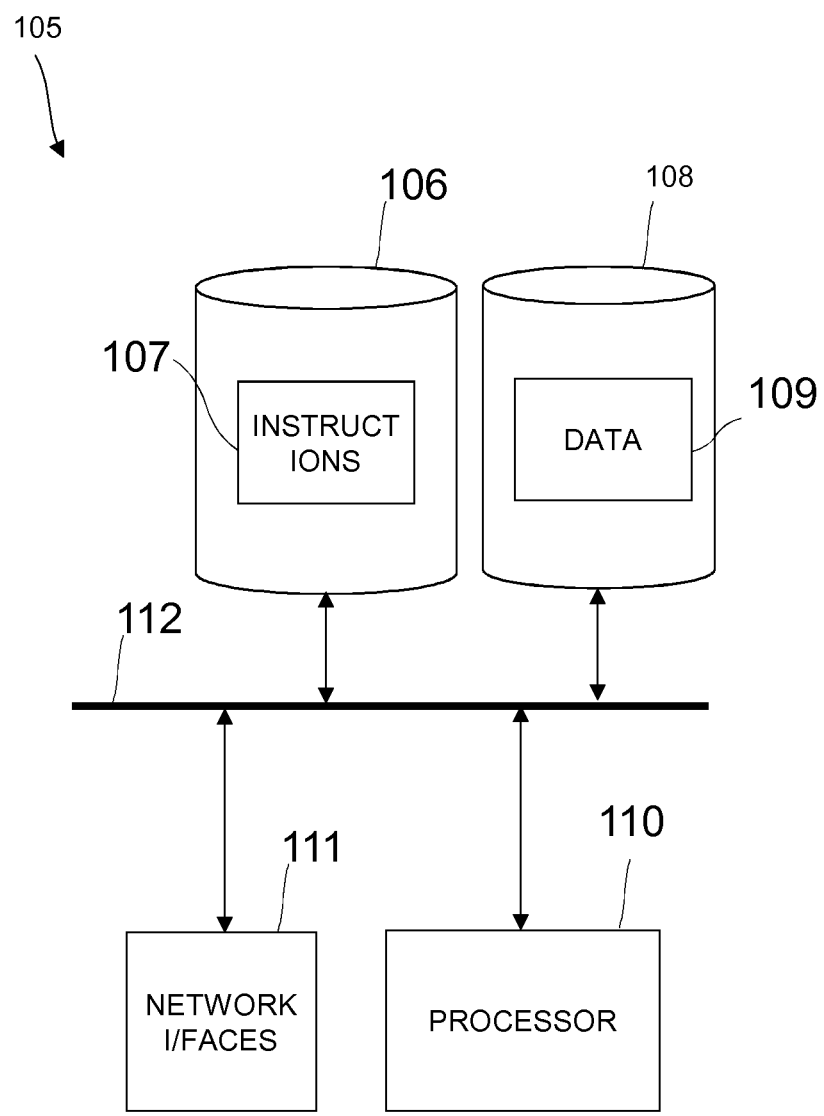
FIG. 18 is a schematic diagram illustrating the components of a controller 105 according to an embodiment.

FIG. 18 is a schematic diagram illustrating the components of a controller 105 according to an embodiment. There is provided a memory 106 for storing instructions 107, a memory 108 for storing data 109, a processor 110 for implementing the instructions, a plurality of network interfaces 111 for receiving data and a bus 112 for connecting the components of the orchestrator.

In an embodiment, the controller 105 is configured to:
Receive a request to transmit a data flow from a source node to a destination node,
Schedule the data flow;
Assign a wavelength to the data flow;
Provide an instruction to a multi-wavelength transceiver at the source node to transmit the data flow on an optical signal using the wavelength to a wavelength selective optical switching device at the source node;

Provide an instruction to the wavelength selective optical switching device at the source node to route the optical signal to a port of an optical space switch;

provide the optical space switch with an instruction to route the data flow to a wavelength selective device at the destination node;

Provide an instruction to the wavelength selective switching device at the destination node to route the optical signal to a multi-wavelength transceiver at the destination node; and Provide an instruction to the multi-wavelength transceiver at the destination node to route the optical signal to the destination node.

Figure 19:
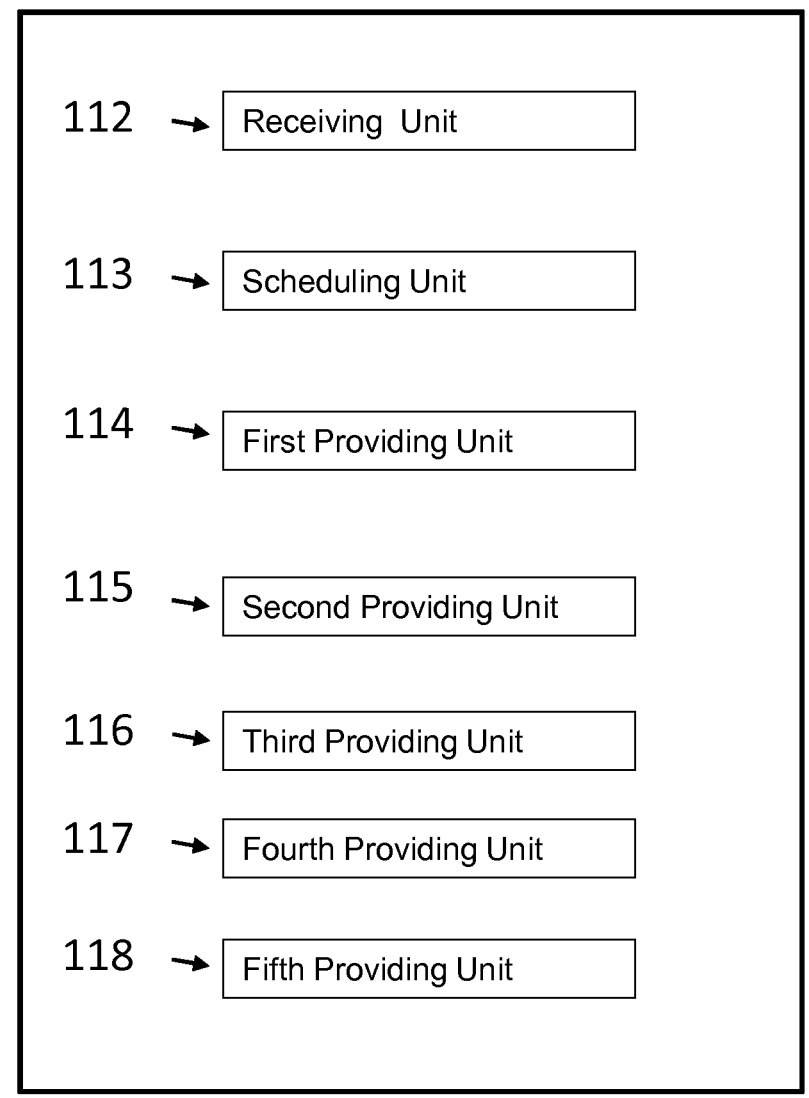
FIG. 19 is a schematic diagram of units for use in a controller according to an embodiment

FIG. 19 is a schematic diagram of units for use in a controller according to an embodiment.

The controller 105 comprises:

A receiving unit 112 for receiving a request to transmit a data flow from a source node to a destination node;

A scheduling unit 113 for scheduling the data flow:

A first providing unit 114 for providing an instruction to a multi-wavelength transceiver at the source node to transmit the data flow on an optical signal using the wavelength to a wavelength selective optical switching device at the source node A second providing unit 115 for providing an instruction to the wavelength selective optical switching device at the source node to route the optical signal to a port of an optical space switch;

A third providing unit 116 for providing the optical space switch with an instruction to route the data flow to a wavelength selective device at the destination node;

A fourth providing unit 117 for providing an instruction to the wavelength selective switching device at the destination node to route the optical signal to a multi-wavelength transceiver at the destination node; and A fifth providing unit 118 for providing an instruction to the multi-wavelength transceiver at the destination node to route the optical signal to the destination node.

Figure 20:
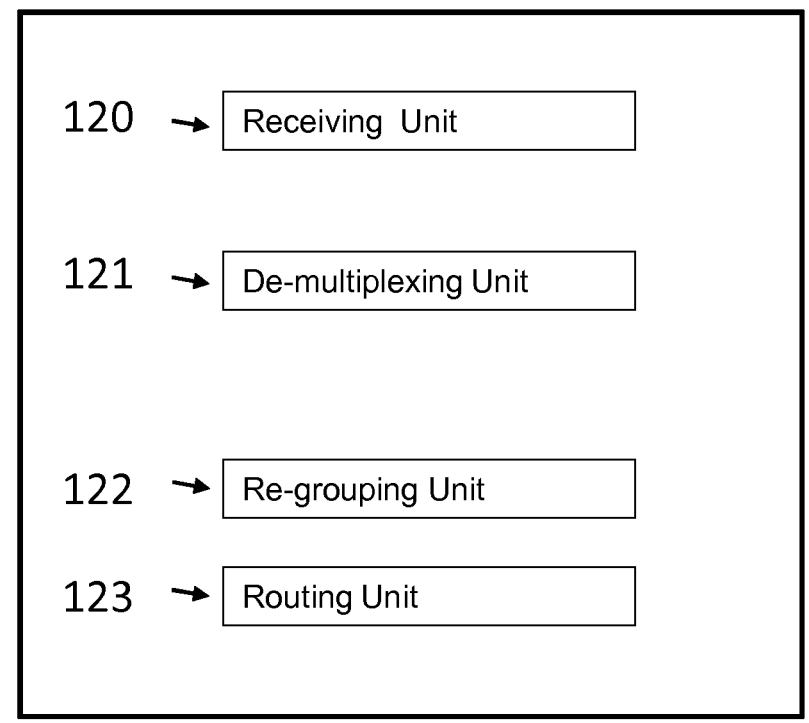
FIG. 20 is a schematic diagram of units for use in a wavelength selective optical switching arrangement 119 according to an embodiment.

FIG. 20 is a schematic diagram of units for use in a wavelength selective optical switching arrangement 119 according to an embodiment. The arrangement comprises:

a receiving unit 120 for receiving one or more groups of optical signals on respective input ports;

a de-multiplexing unit 121 for de-multiplexing each of the one or more groups of optical signals;

a re-grouping unit 122 for re-grouping the optical signals into a single aggregate signal; and a routing unit 123 for routing the aggregate to an output port.

Figure 21:
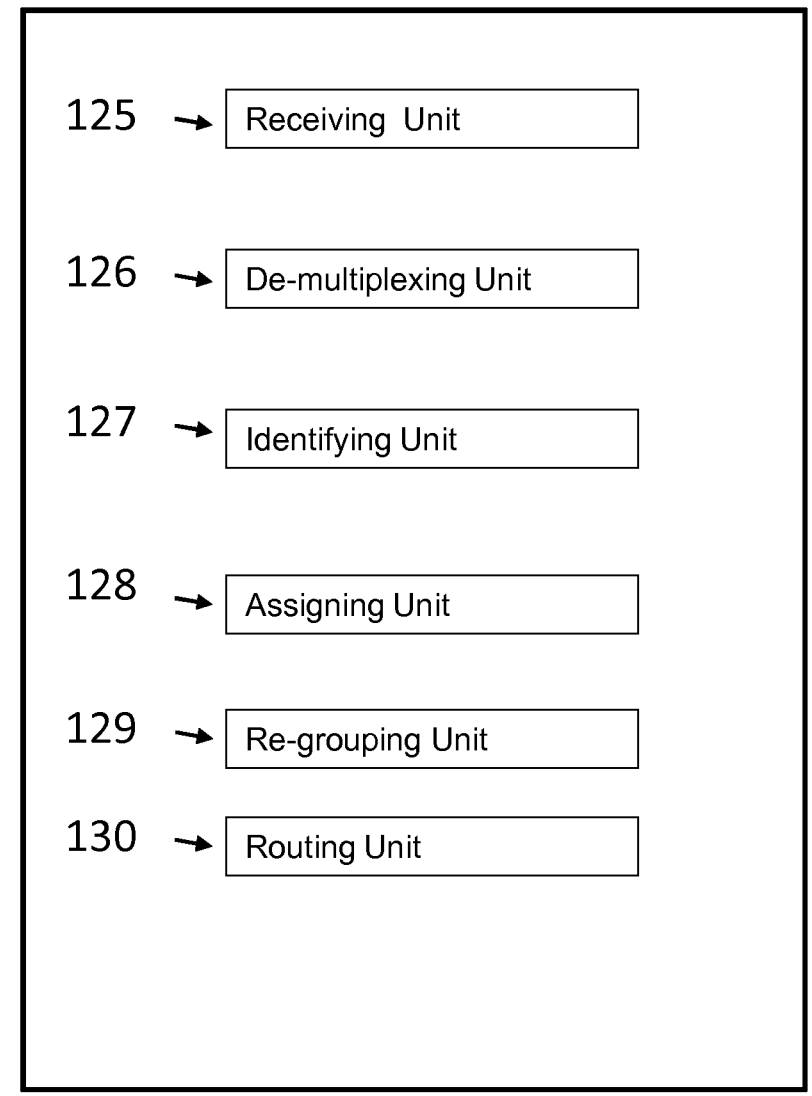
FIG. 21 is a is a schematic diagram of units for use in a wavelength selective optical switching arrangement 124 according to an embodiment.

FIG. 21 is a is a schematic diagram of units for use in a wavelength selective optical switching arrangement 124 according to an embodiment. The arrangement comprises:

a receiving unit 125 for receiving at an input port a group of optical signals from a source node;

a de-multiplexing unit 126 for de-multiplexing the group of optical signals;

an identifying unit 127 for identifying a destination node for each of the optical signals;

an assigning unit 128 for assigning a respective output port for each destination node;

a re-grouping unit 129 for re-grouping the optical signals into destination groups according to their destination node; and a routing unit 130 for routing each destination group to a respective output port.

Figure 22:
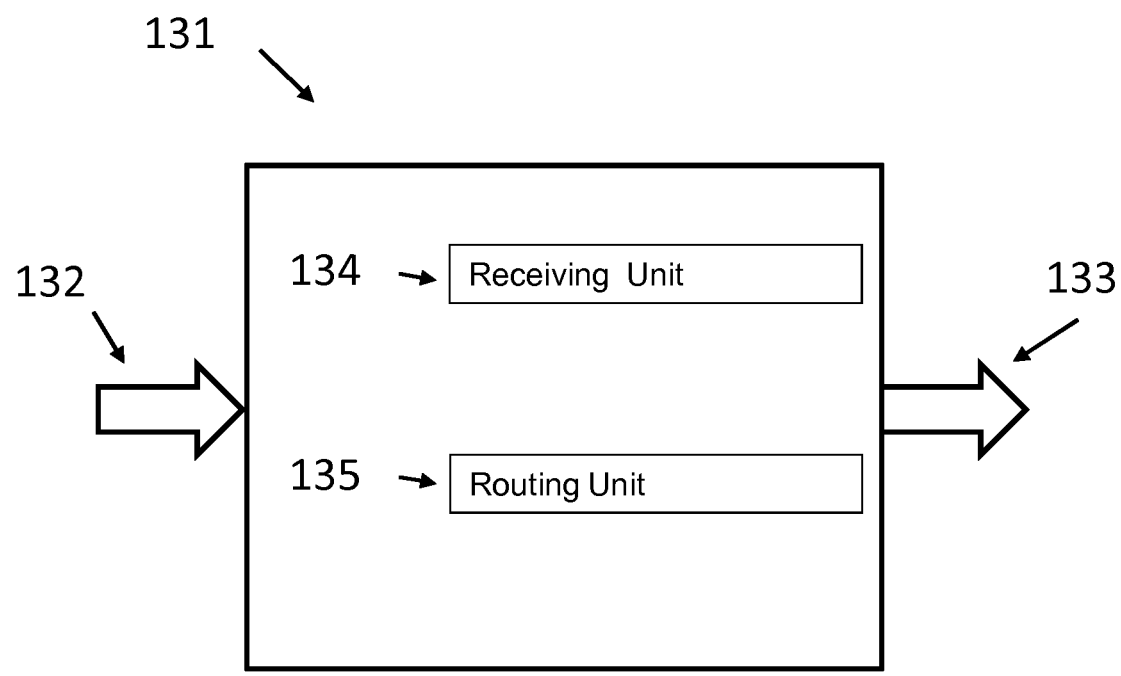
FIG. 22 is a schematic diagram of units for use in an optical switching system according to an embodiment.

FIG. 22 is a schematic diagram of units for use in an optical switching system according to an embodiment:

a plurality of input ports 132 and output ports 133;

a receiving unit 134 for receiving a group of optical signals from a wavelength selective switch associated with a source node; and a routing unit 135 for routing the group to a wavelength selective switch associated with a destination node.

The above units are configured to perform the functions of the apparatus as described above, according to the described method. Any described example may be implemented in a data center network, e.g. an optical offload network of a data center. The offload network may be used for elephant flows.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A wavelength selective optical switching arrangement comprising:
   a set of input ports;
   a set of output ports;
   a switching matrix; and
   a plurality of de-multiplexers each comprising an aggregate port and a plurality of tributary ports, each aggregate port being connected to an input port and each tributary port being connected to the switching matrix, the switching matrix being coupled between the tributary ports and the output ports,
   wherein the wavelength selective optical switching arrangement is configured to:
   receive at an input port a group of optical signals, each optical signal being transmitted on a different wavelength and being assigned to one of a plurality of destination nodes;
   de-multiplex the group of optical signals in said de-multiplexer;
   re-group different subsets of the optical signals into different destination groups according to their destination nodes, wherein each subset of the optical signals with a common destination are re-grouped together, wherein re-grouping different subsets of the optical signals into different destination groups according to their destination nodes comprises:
     re-grouping a first subset of the optical signals into a first destination group to be routed to a first destination node; and
     re-grouping a second subset of optical signals into a second destination group to be routed to a second destination node; and
   route each destination group to a respective output port assigned to the destination group.

2. A wavelength selective optical switching arrangement according to claim 1, wherein the switching matrix comprises a plurality of wavelength selective 2×2 optical switches.

3. A wavelength selective switching arrangement according to claim 2, wherein the switching matrix comprises an optical grid comprising a set of first optical links in a first direction and a set of second optical links in a second direction, the set of first optical links being optically connected to the tributary ports and the set of second optical links being optically connected to the output ports, the 2×2 optical switches being located at nodes of the optical grid, each switch connecting a first optical link to a second optical link and being configured to receive an optical signal at a specified wavelength on the first optical link and being configurable between a first configuration in which the optical signal is passed along the first optical link and a second configuration in which the optical signal is diverted to the second optical link.

4. A wavelength selective optical switching arrangement according to claim 2, wherein the 2×2 optical switches are micro-ring resonators.

5. A wavelength selective optical switching arrangement according to claim 1, further comprising a multi-wavelength transceiver module configured to receive a set of input signals, assign wavelengths to those signals and transmit the signals as optical signals using the assigned wavelengths.

6. A wavelength selective optical switching arrangement according to claim 5 wherein the multi-wavelength transceiver module comprises a plurality of fixed wavelength transceivers, a plurality of electrical connectors, and an electrical cross-connect, the electrical cross-connect being configured to route signals from the electrical connectors to respective fixed wavelength transceivers assigned to respective connectors.

7. A wavelength selective optical switching arrangement according to claim 5, wherein the multi-wavelength transceiver module comprises a plurality of tuneable transceivers and a plurality of electrical connectors, wherein each electrical connector is directly connected to a tuneable transceiver.

8. An optical switching system comprising:
a plurality of wavelength selective optical switching arrangements according to claim 1; and
an optical space switch comprising a plurality of input ports and a plurality of output ports, the space switch being configurable to provide a plurality of optical paths through the matrix, each path linking an input port with an output port;
wherein a subset of the output ports of each wavelength selective optical switching arrangement are optically connected to input ports of the optical space switch and a subset of the input ports of each wavelength selective optical switching arrangement are optically connected to output ports of the optical space switch; and
wherein the optical switching system is configured to provide optical paths for transporting groups of optical signals between wavelength selective optical switching arrangements, wherein each group of optical signals comprises one or more optical signals which have a common destination, each optical signal being transmitted using a different wavelength.

9. An optical switching arrangement according to claim 8, wherein each wavelength selective optical switching arrangement has a plurality of output ports connected to respective input ports of the optical space switch and a single input port connected to a single output port of the space switch.

10. An optical switching arrangement according to claim 8, wherein each wavelength selective optical switching arrangement is configured to route each group of optical signals to an assigned output port.

11. A method of routing a plurality of optical signals transmitted using different wavelengths through a network, the network comprising a plurality of nodes, wherein each node may be a source node, a destination node or both, the method comprising:
at a wavelength selective optical switching device comprising a plurality of input ports and a plurality of output ports:
receiving at an input port a group of optical signals from a source node;
de-multiplexing the group of optical signals;
identifying a destination node for each of the optical signals;
assigning a respective output port for each destination node;
re-grouping different subsets of the optical signals into different destination groups according to their destination nodes, wherein each subset of the optical signals with a common destination are re-grouped together, wherein re-grouping different subsets of the optical signals into different destination groups according to their destination nodes comprises:
re-grouping a first subset of the optical signals into a first destination group to be routed to a first destination node; and
re-grouping a second subset of optical signals into a second destination group to be routed to a second destination node; and
routing each destination group to the respective output port.

12. The method according to claim 11, wherein the network is a data center network.

13. The method according to claim 11, further comprising, at an optical space switch comprising a plurality of input ports and output ports, receiving a group of optical signals from a wavelength selective optical switching arrangement connected to a source node and routing the group to a wavelength selective switch connected to a destination node.

14. The method according to claim 13, further comprising, at a wavelength selective space switch associated with a destination node:
receiving one or more groups of optical signals on respective input ports;
de-multiplexing each of the one or more groups of optical signals;
re-grouping the optical signals into a single aggregate signal; and
routing the aggregate to an output port.

15. A method according to claim 14, wherein the step of routing comprises switching, by means of a 2×2 switch, each wavelength from a first optical link associated with an input port to a second optical link associated with an output port.

* * * * *